(12) United States Patent
Nomi et al.

(10) Patent No.: US 8,501,281 B2
(45) Date of Patent: Aug. 6, 2013

(54) SHINING COATING FILM FORMATION METHOD AND COATED ARTICLE

(75) Inventors: Emi Nomi, Saitama (JP); Takeshi Ogawa, Saitama (JP); Atsuo Magoshi, Osaka (JP); Koji Nakajima, Osaka (JP); Masanobu Inoue, Osaka (JP); Yoshiki Takaira, Osaka (JP)

(73) Assignees: Honda Motor Co., Ltd., Tokyo (JP); Nippon Paint Co., Ltd., Osaka (JP); Nippon Bee Chemical Co., Ltd., Osaka (JP)

( * ) Notice: Subject to any disclaimer, the term of this patent is extended or adjusted under 35 U.S.C. 154(b) by 1064 days.

(21) Appl. No.: 12/391,335

(22) Filed: Feb. 24, 2009

(65) Prior Publication Data

US 2009/0246545 A1 Oct. 1, 2009

(30) Foreign Application Priority Data

Mar. 31, 2008 (JP) ................ 2008-091937

(51) Int. Cl.
*B05D 5/00* (2006.01)

(52) U.S. Cl.
USPC ..... 427/409; 427/402; 427/407.1; 428/411.1; 428/480; 428/482

(58) Field of Classification Search
USPC .......... 428/411.1, 480, 482; 427/407.1, 427/402, 409
See application file for complete search history.

(56) References Cited

FOREIGN PATENT DOCUMENTS

| JP | 2001-347223 | 12/2001 |
|---|---|---|
| JP | 2002-179986 | 6/2002 |
| JP | 2005-7219 | 1/2005 |
| JP | 2006-150169 | 6/2006 |

OTHER PUBLICATIONS

JP 2006-150169 machine translation.*
JP 2002-179986 machine translation.*

* cited by examiner

*Primary Examiner* — Mark Kopec
*Assistant Examiner* — Haidung Nguyen
(74) *Attorney, Agent, or Firm* — Roylance, Abrams, Berdo & Goodman, L.L.P.

(57) ABSTRACT

There are provided: a method for forming a shining coating film which can form a coating film extremely excellent in a leveling property and a brightness with good workability and can also realize the reduction of environmental burden; and a coated article excellent in a design property obtained by this method. In a method comprising the steps of sequentially coating a shining material-containing solvent type first base coat coating, a shining material-containing solvent type second base coat coating and a top clear coating onto a base material and baking a formed multilayered coating film at the same time, an improvement is made so that the resin composition and coating nonvolatile concentration of the first and second base coat coatings and the amount of nonvolatiles in the first and second base coating films will have specific conditions.

9 Claims, No Drawings

SHINING COATING FILM FORMATION METHOD AND COATED ARTICLE

BACKGROUND OF THE INVENTION

A. Technical Field

The present invention relates to: a shining coating film formation method which is useful to improve a design property of parts such as automobiles parts and electric appliance parts; and a coated article having an excellent design property which article is obtained by said method.

B. Background Art

To parts such as automobiles parts and electric appliance parts, there is applied a method in which a multilayered metallic coating film is formed on parts comprising plastic materials or metal materials for the purpose of such as providing a metal-tone aesthetic appearance or a metallic tone design and thereby giving a high-quality feeling.

As a method for forming a multilayered metallic coating film, there has so far been known a method by so-called a 3-coat and 1-bake mode or 4-coat and 1-bake mode in which such as a primer coating, a base coat coating, a metallic coating containing a shining material, and a clear coating are sequentially coated to form a multilayer, and then this multilayered coating film is baked at the same time. This method is favorably and commonly adopted in that it is enough that a heating step for curing a coating film is carried out one time. In detail, this method for forming a multilayered metallic coating film by a 3-coat and 1-bake mode or 4-coat and 1-bake mode can be classified into i) a method in which a water base metallic coating is used as a metallic coating for forming an intermediate coating film layer and ii) a method in which a solvent type metallic coating is used as a metallic coating for forming an intermediate coating film layer.

However, as to the aforementioned method i) in which a water base metallic coating is used, although there is an aspect such that a good aesthetic appearance is easy to obtain in that the formed multilayered metallic coating film results in little affinity between layers, yet there is a problem such that: since a water base metallic coating is coated to a surface of an uncured coating film of a base coat coating, the orientation of a shining material may become disordered so as to be insufficient in a metal-tone aesthetic appearance or metallic tone design property. Besides, in the case where the water base coating is used, it is necessary to control the temperature or humidity of coating environment, so that there are disadvantages also in respect to facilities and costs when compared with the aforementioned method in which a solvent type metallic coating is used. Taking these matters into account, the aforementioned method ii) in which a solvent type metallic coating is used is considered as preferable.

As such an art in which a solvent type metallic coating is used, there are known arts in which the step of coating a base coat coating is separated into two steps in which a first base coat coating and a second base coat coating are coated respectively (e.g. refer to patent documents 1 and 2 below). In these prior arts, the brightness is improved by making the amount of solvent larger than usual when the second base coat coating to be coated later is coated. However, even as to this prior art, it is difficult to say that the brightness is sufficiently given.

[Patent Document 1] JP-A-2005-007219
[Patent Document 2] JP-A-2006-150169

SUMMARY OF THE INVENTION

A. Object of the Invention

Thus, an object of the present invention is to provide: a method for forming a shining coating film which is extremely excellent in brightness; and a coated article having an excellent design property which article is obtained by said method.

B. Disclosure of the Invention

The present inventors diligently studied to achieve the above object. As a result, they have found out the following facts. If a method much different from conventional ones is carried out in which two base coat coatings are coated in their respective separated steps similarly to the aforementioned solvent type prior arts, but in which the nonvolatile concentration is not made low when the second base coat coating is coated, but the nonvolatile concentration of the first base coating film is made much high when the second base coat coating is coated, then an extremely excellent brightness which has so far not been obtained by prior arts is obtained. However, as to the second base coat coating, if the nonvolatile concentration of the second base coating film is too high or low when the second base coating film is formed, then the aforementioned effect is not obtained.

That is to say, in the above patent documents 1 and 2, the brightness is improved by, when the second base coat coating is coated, making the nonvolatile concentration lower (5 to 15 mass % in the aforementioned art of patent document 1, and 11 to 18 mass % in the aforementioned art of patent document 2) than conventional concentration range (16 to 30 mass %, described in paragraph 0021 of patent document 1) and thus making the amount of solvent large. Incidentally, when the first base coat coating is coated, the nonvolatile concentration is in the range of 16 to 30 mass % in the art of patent document 1 and in the range of 18 to 28 mass % in the art of patent document 2 and is therefore approximately the same as the conventional range of the nonvolatile concentration (16 to 30 mass %) when a base coat coating is coated.

In contrast, the present inventors have found out that if the brightness is not improved by making the nonvolatile concentration low when the second base coat coating is coated, but if the nonvolatile concentration of the first base coating film is set in an extremely high range (not lower than 75 mass %) when the second base coat coating is coated and if the nonvolatile concentration of the second base coating film is set in a predefined range (50 to 60 mass %) when the second base coating film is formed, then the brightness can be improved. That is to say, they have found out that: if the above setting is made, then since the first base coating film having the extremely high nonvolatile concentration, for example, displays a suction force such that a desert absorbs water, based on a difference in nonvolatile concentration between the first and second coating films, the solvent in the second base coating film is transferred to the first base coating film, and by this forced current of the solvent, a vehicle resin exerts force in a direction of aligning a shining material having the shape of such as scales, and the orientation property of the shining material in the second base coating film is improved, so that the brightness of the second base coating film is much improved.

In addition, the present inventors have also found out that: in order to obtain the first base coating film having a high nonvolatile concentration as mentioned above, it is important to contain a polyester-polycarboxylic acid resin as a resin component in a specific ratio, since the polyester-polycarboxylic acid resin has a property such that even if the nonvolatile concentration is made high, a low-viscosity coating can be obtained; and further, as to the second base coating film, it is important to contain a non-aqueous dispersion resin in a specific ratio, since the non-aqueous dispersion resin has a property of involving a great change of viscosity upon a change of nonvolatile concentration.

Furthermore, it has been found out that: even if the nonvolatile concentration of the first base coating film when the second base coat coating is coated and the nonvolatile concentration of the second base coating film when the second base coating film is formed satisfy the above ranges and even if the resin composition also satisfies the above conditions, problems are caused depending on the nonvolatile concentration when the first base coat coating is coated and on the nonvolatile concentration when the second base coat coating is coated, wherein the problems are that the workability is deteriorated since atomization does not succeed or since it takes too much time to make operation of adjusting the nonvolatile concentration of an uncured coating film before baking, and that the leveling property or brightness of a coating film is deteriorated. Thus, the present inventors made a series of studies by variously changing the nonvolatile concentration when coating the first base coat coating and the nonvolatile concentration when coating the second base coat coating. As a result, they have finally also found out their respective optimum ranges.

The present invention has been completed by these findings.

That is to say, a method according to the present invention for forming a shining coating film is a method for forming a shining coating film comprising the steps of: coating a shining material-containing solvent type first base coat coating onto a base material to form a first base coating film; coating a shining material-containing solvent type second base coat coating onto the first base coating film to form a second base coating film; coating a top clear coating onto the second base coating film to form a clear coating film; and then baking a formed multilayered coating film at the same time; wherein the method is characterized in that: the first base coat coating contains a polyester-polycarboxylic acid in a ratio of 50 to 95 mass % in terms of nonvolatile concentration based on the total resin nonvolatile concentration, the first base coat coating has a nonvolatile concentration of 50 to 65 mass % when coated, and a coating such that the first base coating film will have a nonvolatile concentration of not less than 75 mass % when the second base coat coating is coated is used as the first base coat coating, and further in that: the second base coat coating contains a non-aqueous dispersion resin in a ratio of 5 to 80 mass % in terms of nonvolatile concentration based on the total resin nonvolatile concentration, the second base coat coating has a nonvolatile concentration of 25 to 35 mass % when coated, and a coating such that the second base coating film will have a nonvolatile concentration of 50 to 60 mass % when the second base coating film is formed is used as the second base coat coating.

A coated article according to the present invention is a coated article having a coating film, wherein the coating film is formed by the aforementioned method according to the present invention for forming a shining coating film.

C. Effects of the Invention

The present invention can provide: a method for forming a shining coating film which method can form a coating film that is extremely excellent in a leveling property and a brightness with good workability; and a coated article having an excellent design property which article is obtained by this method. Incidentally, from these method and coated article, there is also obtained an effect such that since the amount of solvent being used is extremely smaller than conventional, the burden on environment is decreased.

DETAILED DESCRIPTION OF THE INVENTION

Hereinafter, detailed descriptions are given about the method according to the present invention for forming a shining coating film and the coated article according to the present invention. However, the scope of the present invention is not bound to these descriptions. And other than the following illustrations can also be carried out in the form of appropriate modifications of the following illustrations within the scope not departing from the spirit of the present invention.

[Method for Forming a Shining Coating Film]:

The method according to the present invention for forming a shining coating film is a method for forming a coating film comprising the steps of: coating a shining material-containing solvent type first base coat coating onto a base material to form a first base coating film to be a first coating film layer; coating a shining material-containing solvent type second base coat coating onto the first base coating film to form a second base coating film to be a second coating film layer; coating a top clear coating onto the second base coating film to form a clear coating film to be a third coating film layer; and then baking a formed multilayered coating film at the same time. On the aforementioned base material, a primer coating film may be formed. Therefore, the method according to the present invention for forming a coating film is not limited to so-called a 3-coat and 1-bake mode, but may occasionally be a 4-coat and 1-bake mode. A coating film obtained by the method according to the present invention for forming a coating film has a multilayered structure such that two layers of the first and second coating film layers contain a shining material, and these two layers containing the shining material are interposed between the base material and the third coating film layer.

In the method according to the present invention for forming a coating film, in the case where a primer coating film is formed using a primer coating, the primer coating is not especially limited, but conventional primer coatings can be used. However, favorable examples include a polyolefin chloride resin coating, a polyolefin resin coating, and an acrylic resin coating. Incidentally, the primer coating may be any of a solvent type coating, a water base coating and a powder coating, and the form of the coating is not limited.

In the method according to the present invention for forming a coating film, both the solvent type first and second base coat coatings contain a shining material. Thereby, an extremely excellent metal-tone aesthetic appearance and an extremely excellent metallic design property can be displayed.

The shining materials contained in the aforementioned first and second base coat coatings, for example, favorably have a scaly shape and are, independently of each other, at least one member selected from the group consisting of a aluminum flake pigment, an interference mica pigment, a colored mica pigment, and alumina flake pigment. In addition, from the viewpoint of circulation, the thickness of the shining material is desirably not less than 0.1 µm. By selecting such a shining material, the method according to the present invention can be applied, even industrially, advantageously as a coating film formation method which avoids problems of a case where aluminum thin pieces are used, namely, problems such that the circulation stability is bad, unevenness easily occurs, and the cost is high, and which is rich in wide usability. Incidentally, the aforementioned "independently of each other" means that a shining material contained in the first base coat coating and a shining material contained in the second base coat coating may be either identical to each other or different from each other.

The first base coat coating favorably has a shining material content of 5 to 25 mass % based on the nonvolatile concentration of the coating. In the case where the shining material content is less than 5 mass %, there is a possibility that the substrate-hiding property may be so low as to cause poorness in appearance. On the other hand, in the case where the shining material content is more than 25 mass %, there is a possibility that the cohesion force of the formed coating film may be so weak as to deteriorate the adhesion.

As the first base coat coating, that which has a nonvolatile concentration of 50 to 65 mass % when coated is used. The nonvolatile concentration of the coating when coated is preferably in the range of 55 to 60 mass %. In the case where the nonvolatile concentration of the first base coat coating when coated is less than 50 mass %, there is a possibility that the burden on environment may increase. In the case where the nonvolatile concentration of the first base coat coating when coated is more than 65 mass %, the nonvolatile concentration of the coating is too much, the viscosity of the coating becomes high, the atomization becomes insufficient, and therefore the coating workability is deteriorated, the leveling property of the first base coating film is also deteriorated, and further the leveling property of the second base coating film formed on the first base coating film is also deteriorated, so that it becomes difficult to obtain an excellent appearance coating film.

In the present invention, a coating such that the first base coating film will have a nonvolatile concentration of not less than 75 mass % when the second base coat coating is coated is used as the first base coat coating.

In order for the first base coating film to have a nonvolatile concentration of not less than 75 mass %, there can be considered such as a method in which setting is made so that an uncured first base coating film will have a nonvolatile concentration of not less than 75 mass % and a method in which a solvent species contained in the first base coat coating is adjusted so that the aforementioned nonvolatile concentration will not be less than 75 mass %. However, in cases where such methods are adopted, they are methods difficult to use industrially, since the management width of the coating workability is limited.

In contrast, in the present invention, the first base coat coating is allowed to contain a polyester-polycarboxylic acid in a ratio of 50 to 95 mass % in terms of nonvolatile concentration based on the total resin nonvolatile concentration in the first base coat coating, so that a coating composition having a high nonvolatile concentration in spite of a low viscosity can be prepared.

By using such a first base coat coating composition, the nonvolatile concentration of the first base coating film when the second base coat coating is coated can be set in an extremely higher range than conventional without undergoing a limitation of a strict coating management width, and thereby the solvent in the second base coating film formed by coating the second base coat coating is transferred to the first base coating film formed by coating the first base coat coating, and by this forced current of the solvent, the orientation property of the shining material in the second base coating film is improved, so that the brightness of the second base coating film is much improved.

As mentioned in the working example part below, the nonvolatile concentration of the first base coating film when the second base coat coating is coated is determined from masses before and after heating which is carried out at 105° C. for 3 hours according to JIS-K-5601-1-2 so that volatiles will not run off immediately after the first base coat coating is coated onto an aluminum foil under the same conditions as those for carrying out the coating film formation method according to the present invention whereby a state just before coating the second base coat coating is established.

Examples of resins being used for the first base coat coating include polyester resins, alkyd resins, epoxy resins, urethane resins, acrylic resins, and polyester-polycarboxylic acid resins, and these are used in combination with curing agents such as amino resins or isocyanates. However, particularly the polyester-polycarboxylic acid resin is essentially used.

If the polyester-polycarboxylic acid is mixed into a coating, then a coating having a high nonvolatile concentration and a low viscosity can be obtained.

The polyester-polycarboxylic acid has a structure having a carboxyl group at a terminal end of a polyester-polyol obtained by ring-opening addition of a lactone compound to a polyfunctional polyol and can favorably be obtained by modifying a terminal end hydroxyl group of the polyester-polyol with an acid anhydride. Hereupon, in the present specification, the "polyester-polyol" means what has two or more chains which have an ester bond and of which the terminal end is a hydroxyl group.

The polyester-polycarboxylic acid favorably has a branching coefficient of not less than 70%. In the case where a polyester-polycarboxylic acid having such a high branching coefficient is used for a coating, an advantage such that the nonvolatile concentration is made high while maintaining an excellent appearance of a coating film is particularly excellent when compared with resins which have hitherto commonly been used. Incidentally, there are also advantages such that excellence in the resistance to acid rain and in the scratch resistance is also achieved and the crosslinking density is increased.

Hereupon, the branching coefficient is represented by a ratio of the number of hydroxyl groups to which the lactone compound added to the number of hydroxyl groups possessed by the polyfunctional polyol which is a starting material for obtaining the polyester-polycarboxylic acid. For example, in the case where the polyfunctional polyol is pentaerythritol, since the number of hydroxyl groups possessed by the pentaerythritol is 4, it follows that in order to obtain a polyester-polycarboxylic acid having a branching coefficient of not less than 70%, it will do if the modification is made so that the number of hydroxyl groups to which the lactone compound added will be 2.8 or more on average. Incidentally, the number of additions of the lactone compound to hydroxyl groups possessed by the above polyfunctional polyol can be quantified by various analytical means, for example, $C^{13}$-NMR.

The nonvolatile acid value of the polyester-polycarboxylic acid obtained by the below-mentioned method is favorably in the range of 50 to 350 mgKOH/g. In the case where the acid value exceeds 350 mgKOH/g, there is a possibility that the viscosity of the resin is too high, so that the nonvolatile concentration of the resin composition is lowered. In the case where the acid value is less than 50 mgKOH/g, the curability of the resin composition is insufficient. The acid value is more favorably in the range of 100 to 300 mgKOH/g, still more favorably 150 to 250 mgKOH/g.

The number-average molecular weight of the polyester-polycarboxylic acid is favorably in the range of 400 to 3500. In the case where the number-average molecular weight exceeds 3500, the viscosity of the resin composition is too high, so that the nonvolatile concentration of the resin composition is lowered. In the case where the number-average molecular weight is less than 400, the curability of the resin composition is insufficient or the water resistance of the coating film is deteriorated. The number-average molecular weight is more favorably in the range of 500 to 2500, still more favorably 700 to 2000. In addition, the ratio of mass-average molecular weight/number-average molecular weight is favorably not more than 1.8. In the case where this ratio exceeds 1.8, the water resistance and/or weather resistance of the coating film is deteriorated. The above ratio is more favorably not more than 1.5, still more favorably not more than 1.35.

In the case where the polyester-polycarboxylic acid has a hydroxyl group, since a carboxyl group and a hydroxyl group are provided to the surface of the coating film at the same time, excellent adhesion is provided when compared with a polyester-polycarboxylic acid which does not have a hydroxyl group, for example, in the case where recoating is carried out.

In that case, the hydroxyl group value of the polyester-polycarboxylic acid is favorably not more than 150 mgKOH/g (in terms of nonvolatiles). In the case where the hydroxyl group value exceeds 150 mgKOH/g, the water resistance of the coating film is deteriorated. The hydroxyl group value is more favorably in the range of 5 to 100 mgKOH/g, still more favorably 10 to 80 mgKOH/g.

Generally, the molar amount of an acid anhydride group of the acid anhydride being used as a whole is desirably in the range of 0.2 to 1.0 times, particularly desirably 0.5 to 0.9 times, of the molar amount of the hydroxyl group being a counterpart of the reaction. In the case where the molar amount of the acid anhydride group relative to the molar amount of the hydroxyl group is less than 0.2 times, the curability of the resultant resin composition is insufficient.

The above polyester-polycarboxylic acid can, for example, be produced by the following two methods.

<Method not Using Catalyst>

A first method for obtaining the polyester-polycarboxylic acid involves ring-opening addition of a lactone compound to a polyfunctional polyol without using a catalyst. As mentioned below, conventionally, it is general that a catalyst such as a tin-based one is used for the ring-opening addition reaction of the lactone compound. The above first method does not use a catalyst.

The polyfunctional polyol being used in the above first method is an alcohol having three or more hydroxyl groups in one molecule. Specific examples of the polyfunctional polyol include glycerol, trimethylolethane, trimethylolpropane, pentaerythritol, and diglycerol. Considering the reactivity, trimethylolethane, trimethylolpropane and pentaerythritol are favorable. The most favorable is pentaerythritol of which the number of hydroxyl groups is large.

On the other hand, examples of the lactone compound include β-propiolactone, β-butyrolactone, γ-butyrolactone, β-valerolactone, δ-valerolactone, δ-caprolactone, ε-caprolactone, various methylated caprolactones such as 4-methylcaprolactone, 3,5,5-trimethylcaprolactone, and 3,3,5-trimethylcaprolactone; and β-methyl-δ-valerolactone, enantolactone and laurolactone. However, γ-butyrolactone, ε-caprolactone and β-methyl-δ-valerolactone are favorable in view of easy availability. The most favorable is ε-caprolactone.

The ring-opening addition reaction in the first method can be carried out under the same conditions as usually known. For example, the polyester-polyol formed by the ring-opening addition of the lactone compound to the polyfunctional polyol is obtained by reacting them in a proper solvent or in the absence of solvent at a temperature of 80 to 200° C. for several hours.

In the ring-opening addition reaction, the molar amount of the lactone compound relative to the molar amount of the hydroxyl group of the polyfunctional polyol is favorably in the range of 0.2 to 10 times. In the case where the molar amount of the lactone compound is less than 0.2 times, a hard resin is formed, so that the impact resistance of the coating film is deteriorated. In the case where the molar amount of the lactone compound is more than 10 times, the hardness of the coating film is deteriorated. The molar amount of the lactone compound is more favorably in the range of 0.25 to 5 times, still more favorably 0.3 to 3 times.

The polyester-polycarboxylic acid is obtained by reacting the acid anhydride with the polyester-polyol obtained in the above way. Examples of the acid anhydride include phthalic anhydride, tetrahydrophthalic anhydride, hexahydrophthalic anhydride, 4-methylhexahydrophthalic anhydride, trimellitic anhydride and succinic anhydride. The reaction can be carried out under usual reaction conditions such as room temperature to 150° C. and ordinary pressure/However, it is not necessary to convert all hydroxyl groups of the polyester-polyol into carboxyl groups, so that hydroxyl groups may remain.

<Two-Step Reaction Method>

A second method for obtaining the polyester-polycarboxylic acid being used for the setting (curable) resin composition according to the present invention involves carrying out the ring-opening addition of the lactone compound in two steps.

The above second method comprises:

(1) a step of subjecting a part of the lactone compound to the ring-opening addition to the polyfunctional polyol, (2) a step of adding a part of the acid anhydride, (3) a step of subjecting the rest of the lactone compound to the ring-opening addition and (4) a step of adding the rest of the acid anhydride.

In the above first step, the polyfunctional polyol is subjected to the ring-opening addition of the lactone compound. As to specific examples of the above polyfunctional polyol and lactone compound, those as already explained about the method not using a catalyst which is the first method are applied as they are.

The amount of the lactone compound in the first step is set in the range of 30 to 70% of the amount of the lactone compound to be added to the polyfunctional polyol. Out of this range, there is a possibility that the aimed branching coefficient is not obtained.

The above reaction between the polyfunctional polyol and the lactone compound differs, only in respect to using a catalyst, from the subject matter previously explained about the ring-opening addition reaction in the first method. As the above catalyst, tetrabutyl titanate, tin-based catalysts such as dibutyltin oxide and dibutyltin dilaurate and phosphoric acid can be used.

The first step is favorably carried out until the lactone compound used is consumed. For this, the proceeding state of the above reaction can be monitored by an analytical means by which the remaining of the lactone compound can be checked, such as FT-IR, so that the end point can be determined.

Many of products at the end of the first step are considered to be those formed by addition of the lactone compound to one or two of hydroxyl groups possessed by the polyfunctional polyol.

In the second method, after the first step, the second step of adding the acid anhydride is carried out. In this second step, a hydroxyl group formed by addition of the lactone compound in the first step is considered to have high reactivity and therefore to predominantly react with the acid anhydride. As the acid anhydride, those as already explained about the method not using a catalyst which is the first method are applied as they are.

The second step can be carried out in the same way as the procedure by which the acid anhydride is reacted with the polyester-polyol in the previous first method. The second step is favorably carried out until the acid anhydride is consumed. For this, in the same way as previously mentioned, the proceeding state of the above reaction can be monitored by an analytical means by which the remaining of the acid anhydride can be checked, so that the end point can be determined.

The amount of the acid anhydride is favorably in the range of 0.3 to 0.8 times by mol of the lactone compound used in the first step. In the case where the amount of the acid anhydride is less than 0.3 times, there is a possibility that the proceeding of ring-opening addition polymerization from the hydroxyl group formed by addition of the lactone compound cannot be prevented, so that the branching coefficient is deteriorated. On the other hand, in the case where the amount of the acid anhydride is more than 0.8 times, there is a possibility that a reaction with a hydroxyl group of unreacted polyfunctional polyol occurs, so that the aimed polyester-polycarboxylic acid cannot be obtained.

In the second method, after the second step, the third step of carrying out further ring-opening addition of the lactone compound is carried out. This step can be carried out based on the subject matter of the ring-opening addition polymerization reaction as previously explained about the first step.

The amount of the lactone compound being used in the third step is an amount given by subtracting the amount of the lactone compound used in the first step from the amount of the lactone compound which adds to the polyfunctional polyol.

The end of the third step can be determined by monitoring the amount of the lactone compound in the same way as of the first step. A product of a structure with a chain having at a terminal end a carboxyl group formed by a reaction of a hydroxyl group (which was formed by ring-opening of the lactone compound) with the acid anhydride and a chain having at a terminal end a hydroxyl group formed by ring-opening of the lactone compound is considered to be obtained at the end of the third step.

In the second method, after the third step, the acid anhydride is further added as the fourth step. This fourth step can be carried out in the same way as the previous second step using a chain elongation terminating agent. In the fourth step, a carboxyl group is considered to be formed mainly by a reaction of a hydroxyl group (which was formed by ring-opening of the lactone compound) with the acid anhydride.

The amount of the acid anhydride being used in the fourth step can be set in the range of 0.3 to 0.6 times, in molar amount, of the lactone compound used in the third step. By making the amount of the acid anhydride small, it becomes possible to make a hydroxyl group remain.

As to the lactone compound being used in the first and third steps and as to the acid anhydride being used in the second and fourth steps, usually, an identical one is used respectively. However, if necessary, it is also possible to use different kinds.

The above polyester-polycarboxylic acid is contained in a ratio of 50 to 95 mass % in terms of nonvolatile concentration based on the total resin nonvolatile concentration. In the case where the amount of the polyester-polycarboxylic acid is smaller than 50 mass %, when the nonvolatile concentration of the coating is set high, the viscosity becomes too high, so that the deterioration of the coating workability due to insufficiency of atomization and the deterioration of the leveling property of the first base coating film and the second base coating film formed on the first base coating film are brought about. In the case where the amount of the polyester-polycarboxylic acid is larger than 95 mass %, the viscosity is lowered, so that the compatibility with a resin in the second base coat coating becomes high, and therefore when the second base coating film is formed on the first base coating film, both coating films mingle into each other, so that the alignment of the shining material becomes disordered to fail to obtain the sufficient brightness-enhancing effect and further that the weather resistance of the resultant coating film is also deteriorated. The above polyester-polycarboxylic acid is favorably contained in a ratio of 60 to 90 mass %, more favorably 70 to 90 mass %.

As resins which may be mixed into the first base coat coating besides the polyester-polycarboxylic acid, there can be cited such as polyester resins, alkyd resins, epoxy resins, urethane resins and acrylic resins, as aforementioned. These can be mixed into the coating either alone respectively or in combinations with each other. However, particularly the acrylic resin is favorably mixed. Although not limited, for example, there can be cited such as acrylic resins synthesized from such as radical polymerizable monomers, hydroxyl group-containing radical polymerizable monomers, and amino group-containing radical polymerizable monomers. Since the acrylic resin is easy to industrially produce because of ease of design and synthesis, it is widely utilized, and many variations as an ingredient are also provided. Particularly, as to an design aspect, there are properties such that: the introduction of a functional group is easy, and the control of the molecular weight is also easy (therefore the adjustment of the nonvolatile concentration and viscosity is easy), and further the compatibility with other resins is also excellent. From such reasons, the acrylic resin can favorably be used.

In the case where the acrylic resin is used as a resin being mixed into the first base coat coating besides the polyester-polycarboxylic acid, the acrylic resin is favorably used in a ratio of 50 to 100 mass % (in terms of nonvolatile concentration) based on the total resin nonvolatile concentration excluding the polyester-polycarboxylic acid. This ratio is more favorably in the range of 80 to 100 mass %.

The second base coat coating favorably has a shining material content of 6 to 35 mass % based on the nonvolatile concentration of the coating. In the case where the shining material content is less than 6 mass %, there is a possibility that the substrate-hiding property may be so low as to cause poorness in appearance. On the other hand, in the case where the shining material content is more than 35 mass %, there is a possibility that the cohesion force of the formed coating film may be so weak as to deteriorate the adhesion.

As the second base coat coating, that which has a nonvolatile concentration of 25 to 35 mass % when coated is used. The nonvolatile concentration of the coating when coated is preferably in the range of 25 to 30 mass %. In the case where the nonvolatile concentration of the second base coat coating when coated is less than 25 mass %, there is a problem that a large amount of solvent must be used, so that the coating take too much time, resulting in deterioration of the workability, and besides there is a possibility that the burden on environment may increase. In the case where the nonvolatile concentration of the second base coat coating when coated is more than 35 mass %, the nonvolatile concentration of the coating is too much, the atomization becomes insufficient, and therefore the coating workability is deteriorated, the leveling property and brightness of the second base coating film are also deteriorated, so that it becomes difficult to obtain an excellent appearance coating film.

In the present invention, a coating such that the second base coating film will have a nonvolatile concentration of 50 to 60 mass % when the second base coating film is formed is used as the second base coat coating. By setting the nonvolatile concentration of the second base coating film in the aforementioned range, a great difference in nonvolatile concentration between the first and second coating films is made, and based on this difference in nonvolatile concentration, the solvent transfer occurs.

As mentioned in the working example part below, the nonvolatile concentration of the second base coating film when the second base coating film is formed is determined from masses before and after heating which is carried out at 105° C. for 3 hours according to JIS-K-5601-1-2 so that volatiles will not run off immediately after the second base coat coating is coated onto an aluminum foil under the same conditions as those for carrying out the coating film formation method according to the present invention whereby a state when forming the second base coating film is established.

Examples of resins usable for the second base coat coating include polyester resins, alkyd resins, epoxy resins, urethane resins, acrylic resins, and non-aqueous dispersion resins, and these are used in combination with curing agents such as amino resins or isocyanate resins. However, particularly the non-aqueous dispersion resin is essentially used.

If the non-aqueous dispersion resin is mixed into a coating, then the coating can be provided with a property of involving a rapid change of viscosity upon a change of nonvolatile concentration of the coating (coating film). The change of nonvolatile concentration means an increase of nonvolatile concentration due to gradual loss of solvent in a series of coating, coat adhering and drying steps. Accompanying this increase of nonvolatile concentration, the viscosity also rapidly increases. By this property, it becomes possible to design the viscosity favorably for each step such that for the coating step, there can be provided a low-viscosity coating which is excellent in the atomization, displays excellent coating workability and is suitable for forming a coating film excellent in the leveling property, and on the other hand, for the coat adhering step, there can be provided a viscosity sufficient to align the shining material during the solvent transfer.

The non-aqueous dispersion resin comprises a core part having a high SP value and a shell part having a low SP value. Since the core part has a high SP value, the insolubility in the solvent in the coating is made, so that the ratio of swelling with the solvent can also be made low, and furthermore the color-back caused by subtle mingling with the base coating film can be prevented. The shell part having a low SP value serves as a branching stabilizer. Furthermore, since the non-aqueous dispersion resin comprises non-crosslinked particles, the minimum melt viscosity during the baking can be made low. In addition, these particles themselves can also be crosslinked by a curing agent, and in this case, since the particles can be coating film-forming components, the addition amount can be made large. Therefore, the non-aqueous dispersion resin can make the substrate-hiding property high to prevent non-coated surface and can provide coating film appearance which is also high in the clearly mirroring property (distinction of image) and the aesthetic appearance.

Incidentally, in the present specification, the SP value is what is called solubility parameter and represents the index of the solubility. The SP value can be calculated by a method as described in J. Polymer Science, A-1, Vol. 5, pp. 1671-1681 (1967), written by SUH, CLARKE. That is to say, the measurement temperature is set for 20° C., and 0.5 g of resin as a sample is weighed into a 100-mL beaker, and 10 mL of good solvent is added using a whole pipet, and dissolution is made by a magnetic stirrer. As the good solvent, dioxane and acetone are used, and as the poor solvent, n-hexane and ion-exchanged water are used. The measurement of the turbidity point is made so that the poor solvent is dropwise added using a 50-mL buret, and the point at which the turbidity is caused is taken as the dropwise addition amount. The SP value δ can be calculated by the following equations.

$$\delta = (V_{ml}^{1/2} \delta_{ml} + V_{mh}^{1/2} \delta_{mh})/(V_{ml}^{1/2} + V_{mh}^{1/2})$$

$$V_m = V_1 V_2 / (\phi_1 V_2 + \phi_2 V_1)$$

$$\delta_m = \phi_1 \delta_1 + \phi_2 \delta_2$$

($V_i$: molecular volume of solvent (mL/mol), $\phi_i$: volume fraction of each solvent at turbidity point, $\delta_i$: SP value of solvent, ml: low SP value poor solvent-mixed system, mh: high SP value poor solvent-mixed system)

JP-A-10-005680 discloses adding a crosslinkable polymer fine particle (micro-gel) to an intermediate coating. This fine particle is added as a rheology control agent and has an object to prevent the affinity or reverse between layers from occurring and to thereby obtain coating film appearance which is high in the clearly mirroring property (distinction of image) and the aesthetic appearance. However, since this particle itself is crosslinked one and cannot be a coating film-forming component, the amount of this particle being added is limited to not more than 15 mass %, and as a result, its ratio of contribution to the lowering of the ratio of swelling with the solvent is small.

The non-aqueous dispersion resin also serves as a rheology control agent and has a function to prevent the affinity or reverse between layers from occurring and to thereby obtain coating film appearance which is high in the clearly mirroring property (distinction of image) and the aesthetic appearance. Furthermore, since this non-aqueous dispersion resin comprises non-crosslinked particles having a core part of a high SP value and since its addition amount can be made large, not only its ratio of contribution to the lowering of the ratio of swelling with the solvent is large, but also the minimum melt viscosity during the baking of the second base coat coating can be made low, and therefore a coating film having a high substrate-hiding property and excellent finished appearance can be obtained. In this point, the non-aqueous dispersion resin differs from the above crosslinkable polymer fine particle (micro-gel).

The non-aqueous dispersion resin favorably has an SP value of 11 to 14 and a difference of 0.5 to 3 in SP value between the core part and shell part. In the case where the difference in SP value is less than 0.5, the nonvolatile concentration of the coating cannot be lowered, dissolution and swelling occur, and the viscosity control effect of the core part is lowered, so that the substrate-hiding property is small, and further the affinity with the first base coat coating occurs, so that the coating film having excellent finished appearance cannot be obtained. In the case where the difference in SP value exceeds 3, there is a possibility that: the dispersing becomes instable, so that the decomposition occurs, or the first and second base coat coatings mingle into each other, so that the reverse or cracking occurs. Favorably the difference in SP value is in the range of 1 to 3.

The non-aqueous dispersion resin has a hydroxyl group value of 100 to 400 mgKOH/g, favorably 130 to 300 mgKOH/g. In the case where the hydroxyl group value is less than 100 mgKOH/g, the curability of the coating is deteriorated. In the case where the hydroxyl group value is more than 400 mgKOH/g, the water resistance may be deteriorated. The acid value is in the range of 0 to 200 mgKOH/g, favorably 0 to 50 mgKOH/g. In the case where the acid value is more than 200 mgKOH/g, the water resistance is deteriorated when a coating film is formed. The average particle diameter ($D_{50}$) is in the range of 0.05 to 5 μm, favorably 0.05 to 1 μm. In the case where the average particle diameter is less than 0.05 μm, the nonvolatile concentration of the coating is lowered. In the case where the average particle diameter is more than 5 μm, the viscosity control effect is inferior, resulting in appearance defect. Tg of the above dispersion-stabilizing resin is favorably not higher than 30° C. In the case where Tg exceeds 30° C., the coating film appearance is inferior, or the chipping resistance is deteriorated.

Polymerizable monomers are copolymerized in a mixed liquid of the dispersion-stabilizing resin and an organic solvent, whereby the non-aqueous dispersion resin can be prepared as non-crosslinked resin particles which are insoluble in the mixed liquid. The dispersion-stabilizing resin constitutes the shell part, and a copolymer of the polymerizable monomers constitutes the core part.

The above polymerizable monomer is favorably a monomer having a functional group. The monomer having a functional group can form a coating film in which the resulting non-aqueous dispersion resin is reacted with a curing agent and is thus 3-dimensionally crosslinked. Representative examples of the monomer having a functional group are as follows. As those having a hydroxyl group, for example, there can be cited such as hydroxyethyl (meth)acrylate, hydroxypropyl (meth)acrylate, hydroxybutyl (meth)acrylate, hydroxymethyl (meth)acrylate, allyl alcohol, and an addition product between hydroxyethyl (meth)acrylate and ∈-caprolactone.

On the other hand, as those having an acid group, for example, there can be cited those having such as a carboxyl group and a sulfonic acid group. As those having a carboxyl group, for example, there can be cited such as (meth)acrylic acid, crotonic acid, ethacrylic acid, propylacrylic acid, isopropylacrylic acid, itaconic acid, maleic anhydride, and fumaric acid. As those having a sulfonic acid group, for example, there can be cited such as t-butylacrylamidosulfonic acid. In the case where the polymerizable monomer having an acid group is used, a part of the acid group is favorably a carboxyl group. Furthermore, there can be cited such as glycidyl group-containing unsaturated monomers (e.g. glycidyl (meth)acrylate) and isocyanate group-containing unsaturated monomers (e.g. m-isopropenyl-α,α-dimethylbenzyl isocyanate and isocyanatoethyl acrylate.

As other polymerizable monomers, for example, there can be cited the following: (meth)acrylic acid alkyl esters such as methyl (meth)acrylate, ethyl (meth)acrylate, isopropyl (meth)acrylate, n-propyl (meth)acrylate, n-butyl (meth)acrylate, t-butyl (meth)acrylate, isobutyl (meth)acrylate, 2-ethylhexyl (meth)acrylate, n-octyl (meth)acrylate, lauryl (meth)acrylate, stearyl (meth)acrylate and tridecyl (meth)acrylate; addition reaction products between fatty acids and acrylic or methacrylic acid ester monomers having an oxirane structure (e.g. a addition reaction product between stearic acid and glycidyl methacrylate); addition reaction products between oxirane compounds containing alkyl groups of not less than $C_3$ and acrylic acid or methacrylic acid; styrene, α-methylstyrene, o-methylstyrene, m-methylstyrene, p-methylstyrene, p-t-butylstyrene; benzyl (meth)acrylate; itaconic acid esters (e.g. dimethyl itaconate); maleic acid esters (e.g. dimethyl maleate); fumaric acid esters (e.g. dimethyl fumarate); and besides, acrylonitrile, methacrylonitrile; methyl isopropenyl ketone; vinyl acetate; "Veova monomer" (trade name, produced by Shell Japan); vinyl propionate, vinyl pivalate, vinyl propionate; ethylene, propylene, butadiene, N,N-dimethylaminoethyl acrylate, N,N-dimethylaminoethyl methacrylate, acrylamide, vinylpyridine. The above polymerizable monomers can be used from among those having a functional group and other monomers either alone respectively or in combinations with each other.

The above polymerizable monomers are favorably copolymerized in the presence of a radical polymerization initiator. As the radical polymerization initiator, for example, there can be cited: azo initiators such as 2,2'-azobisisobutyronitrile and 2,2'-azobis(2,4-dimethylvaleronitrile); and peroxide initiators such as benzoyl peroxide, lauryl peroxide and t-butyl peroctoate. The amount of these initiators being used is in the range of 0.2 to 10 mass parts, favorably 0.5 to 5 mass parts, per 100 mass parts of the total of the polymerizable monomers. The polymerization reaction in an organic solvent containing the dispersion-stabilizing resin is, generally, favorably in the temperature range of about 60 to about 160° C. for about 1 to about 15 hours.

The dispersion-stabilizing resin, which is made present when the polymerizable monomers are copolymerized, is not especially limited, if it can stably synthesize the non-aqueous dispersion resin in an organic solvent. Specifically, the hydroxyl group value is in the range of 10 to 250 mgKOH/g, favorably 20 to 180 mgKOH/g. In the case where the hydroxyl group value is less than 10 mgKOH/g, such as curability, adhesion and stability are deteriorated. In the case where the hydroxyl group value exceeds 250 mgKOH/g, the dispersing becomes instable. The acid value is in the range of 0 to 100 mgKOH/g, favorably 0 to 50 mgKOH/g. In the case where the acid value exceeds 100 mgKOH/g, the water resistance is deteriorated when a coating film is formed. The number-average molecular weight is favorably in the range of 2000 to 10000. In the case where the number-average molecular weight is less than 2000, the dispersing becomes instable. In the case where the number-average molecular weight exceeds 10000, the nonvolatile concentration of the coating is lowered. The number-average molecular weight is a value in terms of polystyrene by GPC (gel permeation chromatography).

The method for producing the dispersion-stabilizing resin is not especially limited. For example, as favorable ones, there can be cited such as a method in which the resin is obtained by radical polymerization in the presence of the radical polymerization initiator, and a method in which the resin is obtained by a condensation reaction or an addition reaction. As the dispersion-stabilizing resin, there can be used such as acrylic resins, polyester resins, polyether resins, polycarbonate resins, and polyurethane resins. The monomer being used to obtain the dispersion-stabilizing resin can be selected fitly according to properties of the resin. However, the monomers having a functional group such as a hydroxyl group or an acid group, which are used as the aforementioned polymerizable monomers, are favorably used. Furthermore, if necessary, those having a functional group such as a glycidyl group or an isocyanate group may be used. The monomers having a functional group can form a coating film in which the resulting non-aqueous dispersion resin is reacted with a curing agent and is thus 3-dimensionally crosslinked.

As to the monomer being used to obtain the dispersion-stabilizing resin, those having a side chain containing 10 or more carbon atoms are favorably contained in a ratio of 10 to 50 mass % based on the entirety of the monomers. In the case where the ratio is less than 10 mass %, affinity with the base coat coating occurs. In the case where the ratio exceeds 50 mass %, there is a possibility that: decomposition occurs in the second base coat coating, or the first and second base coat coatings mingle into each other, so that the reverse or cracking occurs.

Furthermore, as to the above monomer, those having a hydrophilic group are favorably contained in a ratio of 20 to 50 mass % based on the entirety of the polymerizable monomers. In the case where the ratio is less than 20 mass %, curability, adhesion and stability may be inferior. In the case where the ratio exceeds 50 mass %, the dispersibility may become instable. As the above hydrophilic group, there can be cited a hydroxyl group, a carboxyl group, an amide group and an ether group.

The ratio between the above dispersion-stabilizing agent and the above polymerizable monomer can be selected arbitrarily according to the purpose. However, for example, based on the total mass of both components, the dispersion-stabilizing resin is in the range of 3 to 80 mass %, favorably 5 to 60 mass %, and the polymerizable monomer is in the range of 97 to 20 mass %, favorably 95 to 40 mass %. Furthermore, the total concentration of the dispersion-stabilizing agent and the polymerizable monomer in an organic solvent is in the range of 30 to 80 mass %, favorably 40 to 60 mass %, based on the total mass.

The non-aqueous dispersion resin obtained in the above way is contained in a ratio of 5 to 80 mass % in terms of nonvolatile concentration based on the total resin nonvolatile concentration. In the case where the ratio is less than 5 mass %, the property of the non-aqueous dispersion resin of involving a great change of viscosity upon a change of nonvolatile concentration is not sufficiently displayed, so that the rise of the viscosity upon the rise of the nonvolatile concentration of from the coating of the second base coat coating till the formation of the second base coating film is small. Therefore, the viscosity of the second base coating film during the formation of the second base coating film is not sufficiently obtained, and sufficient force is not caused when the shining material is aligned by the solvent transfer, so that the sufficient brightness is not obtained. In the case where the ratio is exceeds 80 mass %, the aforementioned property of the non-aqueous dispersion resin is strongly displayed, the viscosity becomes high before the shining material is aligned by the solvent transfer, the solvent does not smoothly transfer, so that the brightness-improving effect by the solvent transfer is not sufficiently obtained. The ratio is more favorably in the range of 30 to 60 mass %.

As resins which may be mixed into the second base coat coating besides the non-aqueous dispersion resin, there can be cited such as polyester resins, alkyd resins, epoxy resins, urethane resins and acrylic resins, as aforementioned. These can be mixed into the coating either alone respectively or in combinations with each other. However, particularly the acrylic resin is favorably mixed. Although not limited, for example, there can be cited such as acrylic resins synthesized from such as radical polymerizable monomers, hydroxyl group-containing radical polymerizable monomers, and amino group-containing radical polymerizable monomers. As mentioned above, since the acrylic resin is easy to industrially produce because of ease of design and synthesis, it is widely utilized, and many variations as an ingredient are also provided. Particularly, as to an design aspect, there are properties such that: the introduction of a functional group is easy, and the control of the molecular weight is also easy (therefore the adjustment of the nonvolatile concentration and viscosity is easy), and further the compatibility with other resins is also excellent. Therefore, similarly to the first base coat coating, also as to the second base coat coating, the acrylic resin can favorably be used.

In the case where the acrylic resin is used as a resin being mixed into the second base coat coating besides the non-aqueous dispersion resin, the acrylic resin is favorably used in a ratio of 60 to 100 mass % (in terms of nonvolatile concentration) based on the total resin nonvolatile concentration excluding the non-aqueous dispersion resin. This ratio is more favorably in the range of 80 to 100 mass %.

If necessary, within the range not damaging the effects of the present invention, it is also possible to make each of the first and second base coat coatings contain such as coloring pigments (e.g. organic pigments such as azolake pigments, insoluble azo pigments, condensed azo pigments, phthalocyanine pigments, indigo pigments, perinone pigments, perylene pigments, phthalon pigments, dioxazine pigments, quinacridone pigments, isoindolinone pigments, diketopyrrolopyrrole pigments, benzimidazolone pigments, metal complex pigments; inorganic pigments such as yellow iron oxide, red iron oxide, carbon black, titanium dioxide) and extenders (e.g. talc, calcium carbonate, precipitated barium sulfate, silica).

The top clear coating for forming a third coating film layer in the coating film formation method according to the present invention is not especially limited. Conventional top clear coatings can be used. However, for example, there can favorably be cited at least one selected from among 1-package type polyurethane coatings, 2-package type polyurethane coatings, melamine resin setting coatings, and acid-epoxy setting coatings (e.g. a solvent type clear coating comprising a carboxyl group-containing polymer and an epoxy group-containing polymer, as described in JP-B-08-019315; hereupon, as a commercially available product, for example, "Macflow O-330 Clear" produced by Nippon Paint Co., Ltd.). Incidentally, the top clear coating may be any of solvent type coating, water base coating and powder coating, and the form of the coating is not limited. However, a high solid clear coating having a nonvolatile concentration of not less than 52 mass % when coated is favorable, and this coating can further reduce the amount of the solvent being used, so that the further reduction of the environmental burden can be realized.

If necessary, it is also possible to make each of the primer coating (being coated if necessary), the first and second base coat coatings and the top clear coating contain components which are usually mixed as additives for coatings, foe example, such as crosslinking agents, surface conditioners, rheology control agents, ultraviolet absorbents, photostabilizing agents, antioxidants and curing catalysts, besides the aforementioned components.

In the coating film formation method according to the present invention, the primer coating is favorably coated so that the dry film thickness of the primer coating film being formed will be in the range of 5 to 15 µm.

In the coating film formation method according to the present invention, the first base coat coating is favorably coated so that the dry film thickness of the first base coating film being formed will be in the range of 14 to 22 µm, more favorably. 15 to 20 µm. In the case where the dry film thickness of the first base coating film is less than 14 µm, there is a possibility that it becomes impossible to absorb a sufficient amount of solvent when the solvent transfers from the second base coating film, so that the deterioration of the brightness is brought about and further that the substrate-hiding property is lowered. On the other hand, in the case where the dry film thickness of the first base coating film exceeds 22 µm, there is a possibility that: the amount of discharge from a coating machine becomes too large when coating, thus causing a tendency toward the atomization defect and the decrease of coat-adhering nonvolatile concentration, so that the orientation defect of the shining material is brought about, thus damaging the brightness, and besides, since the amount of the solvent being discharged increases, it takes too much time to adjust the coating film nonvolatile concentration to a desirable one when the second base coating film is formed, or environmental burden increases.

In the coating film formation method according to the present invention, the second base coat coating is favorably coated so that the dry film thickness of the second base coating film being formed will be in the range of 4 to 8 μm, more favorably. 4 to 6 μm. In the case where the dry film thickness of the second base coating film is less than 4 μm, there is a possibility that: it becomes difficult to make the shining material contain in an amount desirable for proving the brightness, so that the sufficient brightness cannot be provided and further that the substrate-hiding property is lowered. On the other hand, in the case where the dry film thickness of the second base coating film exceeds 8 μm, there is a possibility that: the solvent transfer does not sufficiently occur, so that the brightness-improving effect is not sufficiently obtained, and further that a large amount of coating having a low nonvolatile concentration is discharged when coating, thus causing a tendency toward the atomization defect and the decrease of coat-adhering nonvolatile concentration, so that the orientation defect of the shining material is brought about, thus damaging the brightness.

In the coating film formation method according to the present invention, the first and second base coat coatings are favorably coated by adjusting such as the coating amounts of the first and second base coat coatings so that the ratio of the dry film thickness of the first base coating film to the dry film thickness of the second base coating film will be in the range of 2.5 to 5. As mentioned above, the dry film thickness of the first base coating film and the dry film thickness of the second base coating film are favorably in the range of 14 to 22 μm and in the range of 4 to 8 μm respectively, and it is favorable to make the dry film thickness of the second base coating film thinner than the dry film thickness of the first base coating film. In the case where the ratio of the dry film thickness of the first base coating film to the dry film thickness of the second base coating film deviates from the aforementioned range, there is a possibility that the aforementioned problems occur with respect to each of the dry film thickness of the first base coating film and the dry film thickness of the second base coating film.

In the coating film formation method according to the present invention, the first and second base coat coatings are favorably coated by adjusting such as the coating amounts of the first and second base coat coatings so that the mass ratio P1/P2 between the shining material content P1 in the first base coating film and the shining material content P2 in the second base coating film will be in the range of 1/1 to 1/4. In the case where the ratio deviates from this range, there is a possibility that: the hiding defect is brought about, or it becomes difficult to display a sufficiently excellent brightness.

In the coating film formation method according to the present invention, the first and second base coat coatings are favorably coated by adjusting such as the coating amounts of the first and second base coat coatings so that when the top clear coating is coated after forming the second base coating film on the first base coating film, the total coating film nonvolatile concentration of two layers of the multilayered coating film, namely, the first and second base coating films, will not be lower than 75 mass %. In the case where the coating operation is made under conditions where the total coating film nonvolatile concentration of the two layers of the multilayered coating film will be lower than 75 mass %, there is a possibility that: it becomes easy for a solvent in the top clear coating to permeate the first or second base coating film, thus lowering the viscosity to disorder the orientation of the shining material, so that the brightness is damaged. Incidentally, the total coating film nonvolatile concentration of the two layers of the multilayered coating film may, for example, as mentioned in the working example part below, be determined from masses before and after heating which is carried out at 105° C. for 3 hours according to JIS-K-5601-1-2 so that volatiles will not run off immediately after the first and second base coat coatings are sequentially coated onto such as an aluminum foil under the same conditions as those for carrying out the coating film formation method according to the present invention whereby a state when coating the top clear coating (just before coating the top clear coating) is established.

In the coating film formation method according to the present invention, an arrangement such that the color difference (ΔE) between a single layer of the first base coating film and the multilayered coating film of the first and second base coating films will be within 10 is favorable for preventing the see-through unevenness caused by the hiding property defect of the second base coating film. The color difference is more favorably set within 8. The arrangement such that the color difference between the single layer of the first base coating film and the multilayered coating film of the first and second base coating films will be within 10 can specifically be achieved by selecting such as an identical shining material and an identical coloring pigment or approximately the same kinds of shining materials (e.g. both are aluminum flake pigments but differ from each other) and approximately the same kinds of coloring pigments (e.g. both are coloring pigments of the same color but differ from each other) as the shining material being contained in the first base coat coating and the coloring pigment being optionally contained therein and as the shining material being contained in the second base coat coating and the coloring pigment being optionally contained therein. Incidentally, the color difference between both coating films is determined by a method in which: each of the single layer of the first base coating film and the multilayered coating film of the first and second base coating films is formed and then bake-dried at 80° C. for 20 minutes without piling a clear coating film, and then measurement is made with a color difference meter (e.g. "Minolta CR-300" produced by Minolta Co., Ltd.).

In the coating film formation method according to the present invention, the top clear coating is favorably coated so that the dry film thickness of the clear coating film being formed will be in the range of 15 to 45 μm, more favorably 20 to 40 μm. In the case where the dry film thickness of the clear coating film is less than 15 μm, there is a possibility that defects such as coating film appearance defect and durability deterioration occur. On the other hand, the dry film thickness of the clear coating film is more than 45 μm, there is a possibility that sagging easily occurs to cause inconvenience to the coating operation.

In the coating film formation method according to the present invention, the method for coating each coating is not especially limited. The coating operation may be made, for example, fitly selecting from among bell coating, spray coating, roll coater coating, brush coating and electrostatic deposition coating in view of such as the form of the coating being used and the surface shape of the base material.

In the coating film formation method according to the present invention, the multilayered coating film formed in the above way (primer coating film being optionally used, first base coating film, second base coating film, clear coating film) is baked at the same time. The heating temperature or time for the baking is not especially limited. However, for example, in the case where the 1-package type or 2-package type polyurethane coating is used as the clear coating, heating may be carried out at 60 to 120° C. for 10 to 60 minutes, and in the case where the melamine resin setting coating or acid-epoxy setting coating is used as the clear coating, heating may be carried out at 120 to 160° C. for 10 to 45 minutes.

The base material to which the coating film formation method according to the present invention can be applied is not especially limited. For example, there can be cited: metal base materials such as iron, aluminum, copper and stainless steel; and plastic base materials such as polyolefins, ABS, polycarbonates and polyurethanes. Above all, the base material is favorably steel for automobiles comprising various materials or the aforementioned plastic base material. Incidentally, the surface, on which the coating film is to be formed, of the base material may, as aforementioned, be coated with a primer coating in advance, for example, by being coated with such as cationic electrodeposition coatings and intermediate coatings. Furthermore, such as intermediate coating film layer may be formed in advance.

[Coated Article]:

The coated article according to the present invention is a coated article having a coating film, wherein the coating film is formed by the aforementioned coating film formation method according to the present invention. Therefore, the coated article according to the present invention has an extremely excellent brightness.

DETAILED DESCRIPTION OF THE PREFERRED EMBODIMENTS

Hereinafter, the present invention is more specifically illustrated by the following Examples of some preferred embodiments. However, the present invention is not limited to these. Hereinafter, unless otherwise noted, the units "mass part(s)" and "mass %" are referred to as simply as "part(s)" and "%" respectively.

PRODUCTION EXAMPLE 1 OF VARNISH

Production of Acrylic Resin Varnish

A reactor equipped with a stirrer, a thermometer, a reflux condenser, dropping funnels, a nitrogen-introducing tube and a heater with a thermostat was charged with 25 parts of butyl acetate. Under stirring, the inside liquid phase temperature was raised to 100° C. This temperature was kept, and while introducing nitrogen, pressure was applied, and the inside liquid phase temperature was raised to 170° C. Next, a monomer mixture solution comprising 18.5 parts of methyl methacrylate, 0.5 parts of acrylic acid, 17 parts of n-butyl acrylate, 51 part of n-butyl methacrylate and 13 part of 2-hydroxyethyl methacrylate and an initiator solution comprising 1.5 parts of a peroxide type polymerization initiator (di-tert-amyl peroxide) and 7 parts of butyl acetate were dropwise added from their respective separate dropping funnels over a period of 3 hours to initiate a polymerization reaction. After the end of this dropwise addition, aging was carried out by keeping the inside liquid phase temperature at 170° C. for 30 minutes, thus completing the polymerization reaction. Next, after the inside liquid phase temperature had been dropped to 120° C., an mixture solution comprising 0.2 parts of a peroxide type polymerization initiator ("tert-amyl peroxy-2-ethylhexanoate" produced by ARKEMA YOSHITOMI, LTD.) and 1 part of butyl acetate were dropwise added from a dropping funnel over a period of 30 minutes, thus completing the polymerization reaction. Next, after the inside liquid phase temperature had been dropped to 80° C., the pressure in the reactor was returned to ordinary pressure, thus obtaining an acrylic resin varnish. As to this acrylic resin varnish, the residual nonvolatile concentration when it had been heated at 105° C. for 3 hours according to JIS-K-5601-1-2 was measured. As a result, the resin nonvolatile concentration of the obtained acrylic resin varnish was 75%.

PRODUCTION EXAMPLE 2 OF VARNISH

Production of Polyester-polycarboxylic Acid Resin Varnish

A reactor equipped with a stirrer, a thermometer, a reflux condenser, dropping funnels, a nitrogen-introducing tube and a heater with a thermostat was charged with 134 parts of trimethylolpropane, 912 parts of ε-caprolactone (molar amount of 8 times of trimethylolpropane) and 0.8 parts of sodium hypophosphite. The inside liquid phase temperature was raised to 170° C. While keeping this temperature and while introducing nitrogen, stirring was carried out for 14 hours. It was confirmed by gas chromatography (produced by Agilent Technologies, Inc.) that the peak based on ε-caprolactone disappeared. Then, the inside liquid phase temperature was dropped to 100° C.

An amount of 154 parts of hexahydrophthalic anhydride (molar amount of 1 time of trimethylolpropane) was added, and the inside liquid phase temperature was raised to 150° C. While keeping this temperature, stirring was continued for 1.5 hours. It was confirmed by FT-IR (produced by Thermo ELECTRON CORPORATION) that the peak based on the acid anhydride group disappeared. Then, the reaction was ended, and 300 parts of butyl acetate was added to make dilution.

The obtained polyester-polycarboxylic acid resin varnish was such that the polyester-polycarboxylic acid had an Mn of 2100, an Mw of 2900, a nonvolatile concentration of 80% and a nonvolatile hydroxyl group value of 161.

In addition, the color number value as measured by APHA mode of a digital color difference meter (OME-2000 produced by Nippon Denshoku Kogyo Co., Ltd.) was 145.

PRODUCTION EXAMPLE 3 OF VARNISH

Production of Non-Aqueous Dispersion Resin Varnish (Production of Dispersing Resin)

A reactor equipped with a stirrer, a thermometer, a reflux condenser, dropping funnels, a nitrogen-introducing tube and a heater with a thermostat was charged with 75 parts of butyl acetate. Under stirring, the inside liquid phase temperature was raised to 110° C. While keeping this temperature and introducing nitrogen, a monomer mixture solution comprising 17 parts of styrene, 25 parts of ethylhexyl methacrylate, 31.6 parts of isobornyl methacrylate, 16.4 parts of 2-hydroxyethyl methacrylate, 20 parts of butyl acetate and 2 parts of t-butyl peroxy-2-ethylhexanoate was dropwise added at a constant rate over a period of 9 hours to initiate a polymerization reaction. After the end of this dropwise addition, furthermore, while keeping the inside liquid phase temperature at 110° C., aging was carried out for 30 minutes, and then a solution comprising 5 parts of butyl acetate and 0.3 parts of t-butyl peroxy-2-ethylhexanoate was dropwise added at a constant rate over a period of 30 minutes. After the end of this dropwise addition, aging was carried out by keeping the inside liquid phase temperature at 110° C. for another 1 hour, thus completing the polymerization reaction. As a result, an acrylic resin varnish (A) having a nonvolatile concentration of 50%, an Mn of 7700, and an Mw of 20800 was obtained.

(Production of Non-aqueous Dispersion Resin Varnish)

A reactor equipped with a stirrer, a thermometer, a reflux condenser, dropping funnels, a nitrogen-introducing tube and a heater with a thermostat was charged with 100 parts of the acrylic resin varnish (A) as obtained by the above production of dispersing resin, 10 parts of butyl acetate and 20 parts of Isopar E (produced by Exxon Mobil Corporation). Under stirring, the inside liquid phase temperature was raised to 110° C. While keeping this temperature and introducing nitrogen, a monomer mixture solution comprising 6.8 parts of styrene, 3.9 parts of n-butyl acrylate, 13.4 methyl methacrylate, 25.6 parts of 2-hydroxyethyl methacrylate, 0.4 parts of methacrylic acid, 17 parts of butyl acetate and 0.25 parts of t-butyl peroxy-2-ethylhexanoate was dropwise added at a constant rate over a period of 3 hours to initiate a polymerization reaction. After the end of this dropwise addition, furthermore, while keeping the inside liquid phase temperature at 110° C., aging was carried out for 30 minutes, and then a solution comprising 3 parts of butyl acetate and 0.2 parts of t-butyl peroxy-2-ethylhexanoate was dropwise added at a constant rate over a period of 30 minutes. After the end of this dropwise addition, aging was carried out by keeping the inside liquid phase temperature at 110° C. for another 1 hour, thus completing the polymerization reaction. As a result, a non-aqueous dispersion resin varnish having a nonvolatile concentration of 50%, a particle diameter of 0.14 μm and a viscosity of 320 mPa/s was obtained.

<Production Example of Resin Beads Dispersion>

Production of Resin Beads

An amount of 40 parts of methyl methacrylate, 20 parts of styrene, 10 parts of n-butyl methacrylate, 10 parts of divinylbenzene, and 20 parts of ethylene glycol methacrylate were uniformly mixed, and thereto 2 parts of a peroxide type polymerization initiator ("Kayaester O" produced by NIPPON KAYAKU CO., LTD.) was mixed and dissolved, thus obtaining a polymerizable monomer composition. Next, this polymerizable monomer composition was placed into 800 parts of an aqueous solution containing methyl cellulose 1.5% and polyvinyl alcohol 1.5%, and, after well stirring, the polymerizable monomer composition was suspended with a homogenizer so that liquid drops of the polymerizable monomer composition would come into a state of fine particles of about 3 to about 20 μm, thus obtaining a suspension. This polymerizable monomer suspension was transferred into a reactor equipped with a stirrer, a thermometer, a reflux condenser, a nitrogen-introducing tube and a heater with a thermostat. While stirring under a nitrogen gas current, the inside liquid phase temperature was raised to 85° C., and a reaction was carried out at this temperature for 6 hours. Furthermore, the inside liquid phase temperature was raised to 90° C. and kept for 3 hours, thus completing the polymerization reaction. Thereafter, the polymerization reaction liquid was cooled, and polymer particles were filtered off with a metal mesh and then well washed and then dried, thus obtaining 95 parts of resin beads of about 3 to about 20 μm.

(Production of Resin Beads Dispersion)

A stainless vessel equipped with a stirrer was charged with 70 parts of butyl acetate, and while stirring, 30 parts of the above resin beads were added, and stirring was carried out so as to achieve uniformity, thus obtaining a dispersion. The nonvolatile concentration of the resin beads was 30%.

PRODUCTION EXAMPLE 1 OF FIRST BASE COAT COATING

A stainless vessel equipped with a stirrer was charged with 30.1 parts of the polyester-polycarboxylic acid resin varnish and 10.7 parts of acrylic resin varnish as obtained by the aforementioned methods of varnish production examples. While stirring, 3.9 parts of methyl amyl ketone and 3.9 parts of DBE (solvent produced by SANKYO CHEMICAL CO., LTD.) were added, and stirring was carried out sufficiently to obtain a uniform mixture. Next, while stirring, 8.6 parts of aluminum flake pigment ("Alpaste MH8801" produced by Asahi Kasei Metals (old name as now changed into Asahi Kasei Chemicals)), nonvolatile concentration 64%) as a shining material was added gradually so that the aluminum flake pigment would not cohere. After the aluminum flake pigment had been sufficiently disintegrated by stirring, 11.8 parts of ethyl 3-ethoxypropionate, 6.1 parts of DBE (solvent produced by SANKYO CHEMICAL CO., LTD.) and 2.0 parts of butyl acetate were added, and then 7.9 parts of the resin beads dispersion (nonvolatile concentration 30%) as obtained by the aforementioned method of resin beads production example was added as a rheology control agent, and then 15.0 parts of isocyanate curing agent ("Colonate HX" produced by Nippon Polyurethane Kogyo Co., Ltd., nonvolatile concentration 100%) was added as a curing agent, and stirring was carried out sufficiently to achieve a uniform state, thus obtaining a first base coat coating (1-1).

As to the obtained coating, the coating nonvolatile concentration (%) and the shining material content (PWC %) are shown in Table 1.

PRODUCTION EXAMPLES 2 TO 10 OF FIRST BASE COAT COATINGS

First base coat coatings (1-2) to (1-10) were obtained in the same way as of Production Example 1 of first base coat coating except that the amounts of the polyester-polycarboxylic acid resin varnish, acrylic resin varnish and other ingredients being charged were changed as shown in Table 1.

As to the obtained coatings, the coating nonvolatile concentration (%) and the shining material content (PWC %) are shown in Table 1.

PRODUCTION EXAMPLE 1 OF SECOND BASE COAT COATING

A stainless vessel equipped with a stirrer was charged with 14.9 parts of the non-aqueous dispersion resin varnish and 14.9 parts of acrylic resin varnish as obtained by the aforementioned methods of varnish production examples. While stirring, 10.4 parts of butyl acetate was added, and stirring was carried out sufficiently to obtain a uniform mixture. Next, while stirring, 9.4 parts of aluminum flake pigment ("Alpaste MH8801" produced by Asahi Kasei Metals (old name as now changed into Asahi Kasei Chemicals)), nonvolatile concentration 64%) as a shining material was added gradually so that the aluminum flake pigment would not cohere. After the aluminum flake pigment had been sufficiently disintegrated by stirring, 3.9 parts of butyl acetate, 25.0 parts of ethyl 3-ethoxypropionate and 5.0 parts of DBE (solvent produced by SANKYO CHEMICAL CO., LTD.) were added, and then 3.5 parts of blocked isocyanate curing agent ("Duranate MFK-60X" produced by Asahi Kasei Corporation, nonvolatile concentration 60%) as a curing agent, 10.4 parts of the resin beads dispersion (nonvolatile concentration 30%) as a rheology control agent as obtained by the aforementioned method of resin beads production example, and 2.6 parts of precipitation inhibitor (dilution of "Disparion 6900-20X" (produced by KUSUMOTO CHEMICALS, LTD.) with Solvesso 150, nonvolatile concentration 4%) were added in this order, and stirring was carried out sufficiently to achieve a uniform state, thus obtaining a second base coat coating (2-1).

As to the obtained coating, the coating nonvolatile concentration (%) and the shining material content (PWC %) are shown in Table 2.

PRODUCTION EXAMPLES 2 TO 11 OF SECOND BASE COAT COATINGS

Second base coat coatings (2-2) to (2-11) were obtained in the same way as of Production Example 1 of second base coat coating except that the amounts of the non-aqueous dispersion resin varnish, acrylic resin varnish and other ingredients being charged were changed as shown in Table 2.

As to the obtained coatings, the coating nonvolatile concentration (%) and the shining material content (PWC %) are shown in Table 2.

TABLE 1

|   |   | 1-1 | 1-2 | 1-3 | 1-4 | 1-5 | 1-6 | 1-7 | 1-8 | 1-9 | 1-10 |
|---|---|---|---|---|---|---|---|---|---|---|---|
| Amount (%) of each component contained | Resin beads (nonvolatile concentration = 30%) | 7.9 | 9.0 | 8.6 | 6.4 | 10.0 | 8.6 | 8.6 | 9.1 | 8.4 | 7.9 |
| | Methyl amyl ketone | 3.9 | 4.5 | 4.3 | 3.2 | 5.0 | 4.4 | 4.1 | 4.4 | 4.0 | — |
| | DBE | 3.9 | 4.5 | 4.3 | 3.2 | 3.1 | 4.4 | 4.1 | 4.4 | 4.0 | 7.9 |
| | Aluminum flake pigment (nonvolatile concentration = 64%) | 8.6 | 9.8 | 9.4 | 7.0 | 10.9 | 9.4 | 9.4 | 10.0 | 9.2 | 8.6 |
| | Acrylic resin (nonvolatile concentration = 75%) | 10.7 | 12.3 | 11.7 | 8.8 | 13.6 | 19.4 | 4.5 | 19.2 | 0.0 | 10.7 |
| | Polyester-polycarboxylic acid resin (nonvolatile concentration = 80%) | 30.1 | 34.5 | 32.9 | 24.7 | 38.3 | 27.3 | 38.1 | 27.0 | 41.4 | 30.1 |
| | Ethyl 3-ethoxypropionate | 11.8 | 0.4 | 4.6 | 12.7 | — | 4.0 | 5.2 | 4.7 | 5.1 | — |
| | DBE | 6.1 | 5.5 | 5.7 | 5.0 | — | 5.6 | 5.9 | 6.3 | 5.8 | 17.9 |
| | Ethyl acetate | — | — | — | 15.2 | — | — | — | — | — | — |
| | Butyl acetate | 2.0 | 2.3 | 2.2 | 1.5 | — | 1.8 | 2.5 | — | 4.8 | 2.0 |
| | Curing agent (nonvolatile concentration = 100%) | 15.0 | 17.2 | 16.4 | 12.3 | 19.1 | 15.0 | 17.6 | 14.8 | 17.3 | 15.0 |
| | Total | 100.0 | 100.0 | 100.0 | 100.0 | 100.0 | 100.0 | 100.0 | 100.0 | 100.0 | 100.0 |
| | Coating nonvolatile concentration (%) | 55.0 | 63.0 | 60.0 | 45.0 | 70.0 | 60.0 | 60.0 | 60.0 | 60.0 | 55.0 |
| | Shining material content (PWC %) in coating nonvolatiles | 10% | 10% | 10% | 10% | 10% | 10% | 10% | 10% | 10% | 10% |
| | NCO equivalents (in curing agent)/OH equivalents (in varnish) | 1/1 | 1/1 | 1/1 | 1/1 | 1/1 | 1/1 | 1/1 | 1/1 | 1/1 | 1/1 |

TABLE 2

|   |   | 2-1 | 2-2 | 2-3 | 2-4 | 2-5 | 2-6 | 2-7 | 2-8 | 2-9 | 2-10 | 2-11 | 2-12 | 2-13 |
|---|---|---|---|---|---|---|---|---|---|---|---|---|---|---|
| Amount (%) of each component contained | Resin beads (nonvolatile concentration = 30%) | 10.4 | 9.3 | 11.4 | 8.0 | 13.2 | 10.4 | 10.4 | 10.4 | 10.4 | 10.4 | 10.4 | 10.4 | 10.4 |
| | Butyl acetate | 10.4 | 9.3 | 11.4 | 8.0 | 13.2 | 10.4 | 10.4 | 10.4 | 10.4 | 10.4 | 10.4 | 10.4 | 10.4 |
| | Aluminum flake pigment (nonvolatile concentration = 64%) | 9.4 | 8.4 | 10.3 | 7.2 | 11.9 | 9.4 | 9.4 | 9.4 | 9.4 | 9.4 | 9.4 | 9.4 | 9.4 |
| | Amide (nonvolatile concentration = 4%) | 2.6 | 2.3 | 2.9 | 2.0 | 3.3 | 2.6 | 2.6 | 2.6 | 2.6 | 2.6 | 2.6 | 2.6 | 2.6 |
| | Blocked isocyanate curing agent (nonvolatile concentration = 60%) | 3.5 | 3.1 | 3.8 | 2.7 | 4.4 | 3.5 | 3.5 | 3.5 | 3.5 | 3.5 | 3.5 | 3.5 | 3.5 |
| | Acrylic resin (nonvolatile concentration = 75%) | 14.9 | 13.5 | 16.5 | 11.5 | 18.9 | 22.5 | 5.0 | 24.9 | 2.5 | 14.9 | 14.9 | 14.9 | 14.9 |
| | Non-aqueous dispersion resin (nonvolatile concentration = 50%) | 14.9 | 13.5 | 16.5 | 11.5 | 18.9 | 3.7 | 29.9 | — | 33.6 | 14.9 | 14.9 | 14.9 | 14.9 |
| | Butyl acetate | 3.9 | 3.5 | — | 3.0 | — | 7.5 | — | 10.0 | — | — | 8.9 | 3.9 | — |
| | Ethyl 3-ethoxypropionate | 25.0 | 25.0 | 21.8 | 25.0 | 8.8 | 25.1 | 23.9 | 23.9 | 22.8 | 23.9 | 25.0 | 12.0 | 20.0 |
| | DBE | 5.0 | 5.0 | 5.5 | 5.0 | 7.5 | 5.0 | 5.0 | 5.0 | 4.9 | 10.0 | 0.0 | 18.0 | — |
| | Ethyl acetate | — | 7.0 | — | 16.3 | — | — | — | — | — | — | — | — | 13.9 |
| | Total | 100.0 | 100.0 | 100.0 | 100.0 | 100.0 | 100.0 | 100.0 | 100.0 | 100.0 | 100.0 | 100.0 | 100.0 | 100.0 |
| | Coating nonvolatile concentration (%) | 30.0 | 27.0 | 33.0 | 23.0 | 38.0 | 30.0 | 30.0 | 30.0 | 30.0 | 30.0 | 30.0 | 30.0 | 30.0 |
| | Shining material content (PWC %) in coating nonvolatiles | 20% | 20% | 20% | 20% | 20% | 20% | 20% | 20% | 20% | 20% | 20% | 20% | 20% |

TABLE 2-continued

| | 2-1 | 2-2 | 2-3 | 2-4 | 2-5 | 2-6 | 2-7 | 2-8 | 2-9 | 2-10 | 2-11 | 2-12 | 2-13 |
|---|---|---|---|---|---|---|---|---|---|---|---|---|---|
| NCO equivalents (in curing agent)/OH equivalents (in varnish) | 90/10 | 90/10 | 90/10 | 90/10 | 90/10 | 90/10 | 90/10 | 90/10 | 90/10 | 90/10 | 90/10 | 90/10 | 90/10 |

EXAMPLES 1 to 15 AND COMPARATIVE EXAMPLES 1 TO 11

First of all, a polypropylene base material was washed with isopropanol and then dried and coated with a primer coating, a first base coat coating, a second base coat coating, and a top clear coating by a 4-coat and 1-bake mode, thus forming coating films. The details are as follows.

As the primer coating, a polypropylene chloride-based solvent type primer coating ("RB116 Primer" produced by Nippon Bee Chemical Co., Ltd.) was used. As the first and second base coat coatings, coatings of Nos. as shown in Tables 1 and 2 respectively were used. As the top clear coating, a polyisocyanate-acrylic resin-based solvent type 2-package polyurethane coating ("R290S Clear" produced by Nippon Bee Chemical Co., Ltd.) was used. Incidentally, the first and second base coat coatings were used immediately after these coatings had been prepared.

The primer coating was coated so that the dry film thickness would be 8 μm, thus forming a primer coating film, which was then left at 25° C. for 3 minutes. Immediately thereafter, the first base coat coating was coated so that the dry film thickness would be as shown in Tables 3 and 4, thus forming a first base coating film, which was then left at 25° C. for 0.5 to 60 minutes so as to have a coating film nonvolatile concentration as before coating of the second base coat coating. Immediately thereafter, the second base coat coating was coated onto the first base coating film so that the dry film thickness would be as shown in Tables 3 and 4, thus forming a second base coating film, which was then left at 25° C. for 5 minutes. Immediately thereafter, the top clear coating was coated so that the dry film thickness would be 30 μm, thus forming a clear coating film. Then, the base material on which the four layers of coating films had been formed was left at 25° C. for 10 minutes and then heated at 80° C. for 20 minutes, thus subjecting the four layers of coating films to baking at the same time. Incidentally, the coating operation of the primer coating was carried out with an air spray gun ("W-71" produced by ANEST IWATA Corporation), the coating operations of the first and second base coat coatings were both carried out with a rotary atomizing type bell coating machine ("Metallic Bell GL-COPES Bell" produced by ABB Industries) at a rotary speed of $3 \times 10^4$ rpm, and the coating operation of the top clear coating was carried out with an air spray gun ("W-71" produced by ANEST IWATA Corporation).

In the above, the nonvolatile concentration of the first base coating film when the second base coat coating was coated was determined from masses before and after heating which was carried out at 105° C. for 3 hours according to JIS-K-5601-1-2 so that volatiles would not run off immediately after the first base coat coating was coated onto an aluminum foil under the same conditions as those for carrying out the coating film formation method according to the present invention whereby a state just before coating the second base coat coating was established.

In addition, the nonvolatile concentration of the second base coating film when the second base coating film was formed was determined from masses before and after heating which was carried out at 105° C. for 3 hours according to JIS-K-5601-1-2 so that volatiles would not run off immediately after the second base coat coating was coated onto an aluminum foil under the same conditions as those for carrying out the coating film formation method according to the present invention whereby a state when forming the second base coating film was established.

EXAMPLE 16

Coating films were formed on a polypropylene base material in the same way as of Example 1 except that as the top clear coating, the polyisocyanate-acrylic resin-based solvent type 2-package polyurethane coating ("R290S Clear" produced by Nippon Bee Chemical Co., Ltd.) was replaced with a high solid clear coating as produced in accordance with the following production example.

<Production Example of High Solid Clear Coating>
(Production of Acrylic Resin)

A reactor equipped with a stirrer, a thermometer, a reflux condenser, dropping funnels, a nitrogen-introducing tube and a heater with a thermostat was charged with 42 parts of butyl acetate. Under stirring, the inside liquid phase temperature was raised to 125° C. While keeping this temperature and introducing nitrogen, a monomer mixture solution comprising 5.3 parts of ethylhexyl acrylate, 45.1 parts of tert-butyl methacrylate, 10 parts of styrene, 1.1 parts of methacrylic acid, 38.5 parts of hydroxybutyl acrylate, and 12 parts of t-butyl peroxy-2-ethylhexanoate as a polymerization initiator was dropwise added from a dropping funnel at a constant rate over a period of 3 hours to initiate a polymerization reaction. The inside liquid phase temperature was about 128° C. to keep a weak reflux state. Next, while keeping the inside liquid phase temperature at 128° C., a solution comprising 5 parts of butyl acetate and 0.5 parts of t-butyl peroxy-2-ethylhexanoate was dropwise added at a constant rate over a period of 1 hour. After the end of this dropwise addition, aging was carried out by keeping the inside liquid phase temperature at 128° C. for another 2 hours, thus completing the polymerization reaction. As a result, an acrylic resin varnish having a nonvolatile concentration of 70%, a weight-average molecular weight of 6000 in terms of polystyrene by GPC (gel permeation chromatography), and a hydroxyl value of 150 by a anhydrous acetic acid-pyridine method was obtained. Incidentally, the nonvolatile concentration is a value obtained by measuring the residual nonvolatile concentration when heating was carried out at 105° C. for 3 hours according to JIS-K-5601-1-2.

(Production of High Solid Clear Coating)

A stainless vessel equipped with a stirrer was sequentially charged with 100 parts of the aforementioned acrylic resin and 15.0 parts of a mixed solvent comprising SOLFIT AC (produced by Kuraray) and butyl acetate in a mass ratio of 3/2 (hereinafter referred to as "mixed solvent"), and they were stirred to mix them uniformly. Subsequently, while stirring, a solution as prepared by dissolving 0.7 parts of Tinuvin 292 (hindered amine, produced by Chiba Specialty Chemicals) and 1.4 parts of Tinuvin 384-2 (ultraviolet absorbent, produced by Chiba Specialty Chemicals) into 10.0 parts of the mixed solvent was charged. Subsequently, 0.7 parts of BYK 310 (surface conditioner, produced by BYK Chemie), 2.8 parts of BYKETOL SPECIAL (surface conditioner, produced by BYK Chemie), and 0.1 parts of dibutyltin dilaurate (curing catalyst) were sequentially charged, and stirring was carried out to achieve a uniformly mixed state. Subsequently, while stirring, 47.6 parts of R-271 curing agent (polyisocyanate curing agent, nonvolatile concentration 75%, NCO 16.5%, produced by Nippon Bee Chemical Co., Ltd.) was charged, thus producing an undiluted liquid clear coating. It was then diluted with 13.0 parts of the mixed solvent, thus producing a high solid clear coating. Hereupon, the viscosity was measured with a #4 Ford cup (produced by Ueshima Seisakusho) at a measurement temperature of 20° C. according to JIS-K-5600-2-2-3 and, as a result, was 20 seconds, and the nonvolatile concentration was 57%.

[Evaluation]

The results of evaluation about the brightness, texture, checkerboard square cut adhesion, gasohol property, and solvent discharge amount of the formed coating films are shown together in Tables 3 and 4.

Hereupon, the methods for measurement and evaluation as adopted in the Examples and Comparative Examples are as follows.

<Brightness>

The brightness was evaluated on the basis of IV values of the formed coating films. The IV values were measured with an IV meter ("ALCOPE LMR-200" produced by Kansai Paint Co., Ltd.).

The larger the IV value is, the superior the brightness is. The smaller the IV value is, the inferior the brightness is.

In the Tables, a case where the IV value exceeds 500 is marked ◯, a case where the IV value is in the range of 450 to 500 is marked ◯Δ, a case where the IV value is in the range of 400 to 450 is marked Δ, and a case where the IV value is less than 400 is marked X.

<Texture>

The evaluation was made by seeing a test plate almost head-on (highlight part) and at an angle of about 15 degrees (shade part) by the eye.

◯: Level and uniform appearance as a coating film.
◯Δ: A little round feeling as a coating film.
Δ: Round appearance as a coating film.
X: A strong round feeling as a coating film and appearance of citron texture.

<Checkerboard Square Cut Adhesion>

In accordance with JIS-K-5600-5.6, a test was made in which: cuts were made into the surface of the prepared coating film with a cutter to make 100 checkerboard square cuts of 2 mm square, and a pressure sensitive tape was stuck thereon and then forcedly released therefrom. Then, judgment was made on the following standards.

◯: No release of the coating film is seen after the test.
X: Release of the coating film is at least partly seen after the test.

<Gasohol Property>

The test piece was cut at its end face and then immersed in a test liquid (gasohol prepared by adding 90 vol. % of regular gasoline to 10 vol. % of ethanol in accordance with JIS-K-8101) at 20° C. in an airtight state for a predetermined time and then taken out, and immediately thereafter such as the state of the liquid and, as to the coating film, occurrences of such as swelling, releasing and wrinkles, discoloring, change of gloss, and much softening of the coating film were examined.

◯: There is no abnormality such as swelling or releasing of the coating film for 60 minutes or more.
Δ: There is no abnormality such as swelling or releasing of the coating film for 30 to 60 minutes.
X: There occurs abnormality such as swelling or releasing of the coating film within 30 minutes.

<VOC (Solvent Discharge Amount)>

The solvent discharge amount was calculated under the following conditions.

If the discharge amount of a coating having a nonvolatile concentration of 51% and a film thickness of 22.5 μm is assumed to be Z, when the thickness of the first base coating film at a nonvolatile concentration of X % is represented by A μm and when the thickness of the second base coating film at a nonvolatile concentration of Y % is represented by B μm, then the discharge amounts are as follows:
first base=Z/(X/51)×A/22.5
second base=Z/(Y/51)×B/22.5 therefore the solvent discharge amount is determined as the following:

discharge amount of first base×(100−X)/100+discharge amount of second base×(100−Y)/100.

A solvent discharge amount of 0.89 to 1.11 at a film thickness width of 20 to 25 μm was aimed at.

TABLE 3

|  |  | Example A1 | Example A2 | Example A3 | Comparative Example B1 | Comparative Example B2 | Example A4 | Example A5 |
|---|---|---|---|---|---|---|---|---|
| First base | Coating nonvolatile concentration when coated | 55% | 63% | 60% | 45% | 70% | 60% | 60% |
|  | Coating film nonvolatile concentration when second base coat coating is coated | 85% | 85% | 85% | 85% | 85% | 85% | 85% |
|  | Polyester-polycarboxylic acid resin/acrylic resin | 75/25 | 75/25 | 75/25 | 75/25 | 75/25 | 60/40 | 90/10 |
|  | Pigment/resins | 10% | 10% | 10% | 10% | 10% | 10% | 10% |
|  | Curing agent ratio NCO/OH | 1/1 | 1/1 | 1/1 | 1/1 | 1/1 | 1/1 | 1/1 |
|  | Production Example | 1-1 | 1-2 | 1-3 | 1-4 | 1-5 | 1-6 | 1-7 |
| Second base | Coating nonvolatile concentration when coated | 30% | 30% | 30% | 30% | 30% | 30% | 30% |
|  | Coating film nonvolatile concentration when second base coating film is formed | 55% | 55% | 55% | 55% | 55% | 55% | 55% |
|  | Non-aqueous dispersion resin/acrylic resin | 40/60 | 40/60 | 40/60 | 40/60 | 40/60 | 40/60 | 40/60 |
|  | Curing agent ratio: |  |  |  |  |  |  |  |

TABLE 3-continued

|  |  |  |  |  |  |  |  |  |
|---|---|---|---|---|---|---|---|---|
|  | resins/curing agent | 90/10 | 90/10 | 90/10 | 90/10 | 90/10 | 90/10 | 90/10 |
|  | Pigment/resins | 20% | 20% | 20% | 20% | 20% | 20% | 20% |
|  | Production Example | 2-1 | 2-1 | 2-1 | 2-1 | 2-1 | 2-1 | 2-1 |
| First base/ second base | Dry film thickness | 15μ/ 5μ | 15μ/ 5μ | 15μ/ 5μ | 15μ/ 5μ | 15μ/ 5μ | 15μ/ 5μ | 15μ/ 5μ |
| Kind of clear coating | R290S Clear | ○ | ○ | ○ | ○ | ○ | ○ | ○ |
|  | High solid clear | — | — | — | — | — | — | — |
| Items of evaluation | Brightness | ○ | ○ | ○ | ○ | ○ | ○ | ○△ |
|  | Texture | ○ | ○△ | ○ | ○ | X | ○△ | ○ |
|  | Checkerboard square cut adhesion | ○ | ○ | ○ | ○ | ○ | ○ | ○ |
|  | Gasohol property | ○ | ○ | ○ | ○ | ○ | ○ | ○ |
|  | VOC | ○△ | ○ | ○ | X | ◎ | ○ | ○ |
|  | (solvent discharge amount) | 1.1 | 0.9 | 1.0 | 1.3 | 0.8 | 1.0 | 1.0 |

|  |  | Comparative Example B3 | Comparative Example B4 | Example A6 | Example A7 | Comparative Example B5 | Example A8 | Example A9 |
|---|---|---|---|---|---|---|---|---|
| First base | Coating nonvolatile concentration when coated | 60% | 60% | 60% | 60% | 55% | 60% | 60% |
|  | Coating film nonvolatile concentration when second base coat coating is coated | 85% | 85% | 75% | 95% | 70% | 85% | 85% |
|  | Polyester-polycarboxylic acid resin/acrylic resin | 40/60 | 100/0 | 75/25 | 75/25 | 75/25 | 75/25 | 75/25 |
|  | Pigment/resins | 10% | 10% | 10% | 10% | 10% | 10% | 10% |
|  | Curing agent ratio NCO/OH | 1/1 | 1/1 | 1/1 | 1/1 | 1/1 | 1/1 | 1/1 |
|  | Production Example | 1-8 | 1-9 | 1-3 | 1-3 | 1-10 | 1-3 | 1-3 |
| Second base | Coating nonvolatile concentration when coated | 30% | 30% | 30% | 30% | 30% | 27% | 33% |
|  | Coating film nonvolatile concentration when second base coating film is formed | 55% | 55% | 55% | 55% | 55% | 55% | 55% |
|  | Non-aqueous dispersion resin/acrylic resin | 40/60 | 40/60 | 40/60 | 40/60 | 40/60 | 40/60 | 40/60 |
|  | Curing agent ratio: resins/curing agent | 90/10 | 90/10 | 90/10 | 90/10 | 90/10 | 90/10 | 90/10 |
|  | Pigment/resins | 20% | 20% | 20% | 20% | 20% | 20% | 20% |
|  | Production Example | 2-1 | 2-1 | 2-1 | 2-1 | 2-1 | 2-2 | 2-3 |
| First base/ second base | Dry film thickness | 15μ/ 5μ | 15μ/ 5μ | 15μ/ 5μ | 15μ/ 5μ | 15μ/ 5μ | 15μ/ 5μ | 15μ/ 5μ |
| Kind of clear coating | R290S Clear | ○ | ○ | ○ | ○ | ○ | ○ | ○ |
|  | High solid clear | — | — | — | — | — | — | — |
| Items of evaluation | Brightness | ○ | △ | ○△ | ○△ | △ | ○ | ○△ |
|  | Texture | X | ○ | ○ | ○△ | ○ | ○ | ○ |
|  | Checkerboard square cut adhesion | ○ | ○ | ○ | ○ | ○ | ○ | ○ |
|  | Gasohol property | ○ | ○ | ○ | ○ | ○ | ○ | ○ |
|  | VOC | ○ | ○ | ○ | ○ | ○ | ○△ | ◎ |
|  | (solvent discharge amount) | 1.0 | 1.0 | 1.0 | 1.0 | 1.0 | 1.0 | 0.9 |

TABLE 4

|  |  | Comparative Example B6 | Comparative Example B7 | Example A10 | Example A11 | Comparative Example B8 | Comparative Example B9 | Example A12 |
|---|---|---|---|---|---|---|---|---|
| First base | Coating nonvolatile concentration when coated | 60% | 60% | 60% | 60% | 60% | 60% | 60% |
|  | Coating film nonvolatile concentration when second base coat coating is coated | 80% | 80% | 80% | 80% | 80% | 80% | 80% |
|  | Polyester-polycarboxylic acid resin/acrylic resin | 75/25 | 75/25 | 75/25 | 75/25 | 75/25 | 75/25 | 75/25 |
|  | Pigment/resins | 10% | 10% | 10% | 10% | 10% | 10% | 10% |
|  | Curing agent ratio NCO/OH | 1/1 | 1/1 | 1/1 | 1/1 | 1/1 | 1/1 | 1/1 |
|  | Production Example | 1-3 | 1-3 | 1-3 | 1-3 | 1-3 | 1-3 | 1-3 |
| Second base | Coating nonvolatile concentration when coated | 23% | 38% | 30% | 30% | 30% | 30% | 30% |
|  | Coating film nonvolatile concentration when second base coating film is formed | 55% | 55% | 55% | 55% | 55% | 55% | 50% |

TABLE 4-continued

|  |  |  |  |  |  |  |  |  |
|---|---|---|---|---|---|---|---|---|
|  | Non-aqueous dispersion resin/acrylic resin Curing agent ratio: | 40/60 | 40/60 | 10/90 | 80/20 | 0/100 | 90/10 | 40/60 |
|  | resins/curing agent | 90/10 | 90/10 | 90/10 | 90/10 | 90/10 | 90/10 | 90/10 |
|  | Pigment/resins | 20% | 20% | 20% | 20% | 20% | 20% | 20% |
|  | Production Example | 2-4 | 2-5 | 2-6 | 2-7 | 2-8 | 2-9 | 2-10 |
| First base/ Second base | Dry film thickness | 15μ/ 5μ | 15μ/ 5μ | 15μ/ 5μ | 15μ/ 5μ | 15μ/ 5μ | 15μ/ 5μ | 15μ/ 5μ |
| Kind of clear coating | R290S Clear | ○ | ○ | ○ | ○ | ○ | ○ | ○ |
|  | High solid clear | — | — | — | — | — | — | — |
| Items of evaluation | Brightness | ○ | X | ○Δ | ○Δ | X | X | ○Δ |
|  | Texture | ○ | Δ | ○ | ○ | ○ | ○ | ○ |
|  | Checkerboard square cut adhesion | ○ | ○ | ○ | ○ | ○ | Δ | ○ |
|  | Gasohol property | ○ | ○ | ○ | ○Δ | ○ | Δ | ○ |
|  | VOC | X | ◎ | ○ | ◎ | ○ | ○ | ○ |
|  | (solvent discharge amount) | 1.2 | 0.8 | 1.0 | 1.0 | 1.0 | 1.0 | 1.0 |

|  |  | Example A13 | Comparative Example B10 | Comparative Example B11 | Example A14 | Example A15 | Example A16 |
|---|---|---|---|---|---|---|---|
| First base | Coating nonvolatile concentration when coated | 60% | 60% | 60% | 60% | 60% | 60% |
|  | Coating film nonvolatile concentration when second base coat coating is coated | 80% | 80% | 80% | 80% | 80% | 85% |
|  | Polyester-polycarboxylic acid resin/acrylic resin | 75/25 | 75/25 | 75/25 | 75/25 | 75/25 | 75/25 |
|  | Pigment/resins | 10% | 10% | 10% | 10% | 10% | 10% |
|  | Curing agent ratio NCO/OH | 1/1 | 1/1 | 1/1 | 1/1 | 1/1 | 1/1 |
|  | Production Example | 1-3 | 1-3 | 1-3 | 1-3 | 1-3 | 1-3 |
| Second base | Coating nonvolatile concentration when coated | 30% | 30% | 30% | 30% | 30% | 30% |
|  | Coating film nonvolatile concentration when second base coating film is formed | 60% | 45% | 65% | 53% | 58% | 55% |
|  | Non-aqueous dispersion resin/acrylic resin Curing agent ratio: | 40/60 | 40/60 | 40/60 | 40/60 | 40/60 | 40/60 |
|  | resins/curing agent | 90/10 | 90/10 | 90/10 | 90/10 | 90/10 | 90/10 |
|  | Pigment/resins | 20% | 20% | 20% | 20% | 20% | 20% |
|  | Production Example | 2-11 | 2-12 | 2-13 | 2-1 | 2-1 | 2-1 |
| First base/ Second base | Dry film thickness | 15μ/ 5μ | 15μ/ 5μ | 15μ/ 5μ | 15μ/ 6μ | 20μ/ 4μ | 15μ/ 5μ |
| Kind of clear coating | R290S Clear | ○ | ○ | ○ | ○ | ○ | — |
|  | High solid clear | — | — | — | — | — | ○ |
| Items of evaluation | Brightness | ○Δ | X | X | ○ | ○ | ○ |
|  | Texture | ○ | ○ | ○ | ○ | ○ | ○ |
|  | Checkerboard square cut adhesion | ○ | ○ | ○ | ○ | ○ | ○ |
|  | Gasohol property | ○ | ○ | ○ | ○ | ○ | ○ |
|  | VOC | ○ | ○ | ○ | ○ | ○Δ | ○ |
|  | (solvent discharge amount) | 1.0 | 1.0 | 1.0 | 1.1 | 1.0 | 1.0 |

[Results]

(1) From the results as shown in Tables 3 and 4, it can be understood that: in any of the Examples, the brightness is excellent. In addition, it can be understood that: since the atomization in the coating step is good, the coating workability is also excellent, so that a coating film excellent also in the leveling property is formed.

(2) In any of the Examples, the solvent discharge amount falls within the range of the aimed value (0.89 to 1.11), so that the reduction of the environmental burden is realized.

(3) Furthermore, it can be understood that: in any of the Examples, the coating film performances being industrially demanded such as checkerboard square cut adhesion and gasohol property are excellent.

(4) In Comparative Example 1, since the coating nonvolatile concentration is low when coating the first base coat coating, the solvent discharge amount is large, so that the environmental burden is large.

(5) In Comparative Example 2, since the coating nonvolatile concentration and the coating viscosity are high when coating the first base coat coating, the atomization in the coating step is bad, so that the leveling property of the coating film is bad.

(6) In Comparative Example 3, since the amount of the polyester-polycarboxylic acid contained in the first base coat coating is small, the viscosity becomes high to deteriorate the atomization, so that the deterioration of the leveling property is caused.

(7) In Comparative Example 4, since the amount of the polyester-polycarboxylic acid contained in the first base coat coating is large, the viscosity during the coat-adhering of the first base coating film decreases too much, and, when the second base coating film is formed on the first base coating film, both coating films mingle into each other, so that the alignment of the shining material becomes disordered, thus bring about the deterioration of the brightness.

(8) In Comparative Example 5, since the nonvolatile concentration of the first base coating film is not sufficiently high when coating the second base coat coating, the solvent transfer from the second base coating film to the first base coating film becomes insufficient, so that the orientation property of the shining material in the second base coating film is not sufficiently improved, thus making the brightness insufficient.

(9) In Comparative Example 6, since the coating nonvolatile concentration is low when coating the second base coat coating, the solvent discharge amount is large, so that the environmental burden is large.

(10) In Comparative Example 7, since the coating nonvolatile concentration and the coating viscosity are high when coating the second base coat coating, the atomization in the coating step is bad, so that the leveling property and brightness of the coating film are also insufficient.

(11) In Comparative Example 8, since the non-aqueous dispersion resin is not contained in the second base coat coating, the property of the non-aqueous dispersion resin of involving a great change of viscosity upon a change of nonvolatile concentration is not displayed, and since the viscosity of the second base coating film is low when forming the second base coating film, sufficient force is not produced when aligning the shining material by the solvent transfer, so that the brightness becomes insufficient.

(12) In Comparative Example 9, since the amount of the non-aqueous dispersion resin contained in the second base coat coating is large, the aforementioned property of the non-aqueous dispersion resin is strongly displayed to make the viscosity high before aligning the shining material by the solvent transfer, so that the solvent does not smoothly transfer, thus failing to sufficiently obtain the brightness-improving effect by the solvent transfer. In addition, performances such as checkerboard square cut adhesion and gasohol property are inferior because of the deterioration of the crosslinking reactivity (curability) due to the particulate property.

(13) In Comparative Example 10, since the nonvolatile concentration of the second base coating film is low when forming the second base coating film, the viscosity of the second base coating film is low, and therefore sufficient force is not produced when aligning the shining material in the second base coating film by the solvent transfer, so that the brightness becomes insufficient.

(14) In Comparative Example 11, since the nonvolatile concentration of the second base coating film is too high when forming the second base coating film, the amount of solvent is small during the coat-adhering, so that the volume shrinkage ratio by the solvent transfer becomes low, and therefore the sufficient brightness is not obtained.

INDUSTRIAL APPLICATION

The shining coating film formation method and coated article according to the present invention can, for example, be used favorably for providing the design property, particularly, the brightness, in uses for parts such as automobiles parts and electric appliance parts, and further are useful also as a substitute for conventional low solid type coatings.

What is claimed is:

1. A method for forming a shining coating film, comprising the steps of: coating a shining material-containing solvent type first base coat coating onto a base material to form a first base coating film; coating a shining material-containing solvent type second base coat coating onto the first base coating film to form a second base coating film; coating a top clear coating onto the second base coating film to form a clear coating film; and then baking a formed multilayered coating film at the same time;

wherein:

the first base coat coating contains a polyester-polycarboxylic acid in a ratio of 50 to 95 mass % in terms of nonvolatile concentration based on a total resin nonvolatile concentration, wherein the total resin nonvolatile concentration relating to the first base coat coating is the total concentration of the nonvolatiles of the polyester-polycarboxylic acid and other resins in the first base coat coating, and wherein the first base coat coating has a nonvolatile concentration of 50 to 65 mass % when coated, and the first base coat coating is a coating such that the first base coating film will have a nonvolatile concentration of not less than 75 mass % when the second base coat coating is coated; and the second base coat coating contains a non-aqueous dispersion resin in a ratio of 5 to 80 mass % in terms of nonvolatile concentration based on a total resin nonvolatile concentration, wherein the total resin nonvolatile concentration relating to the second base coat coating is the total concentration of the nonvolatiles of the non-aqueous dispersion resin and other resins in the second base coat coating, and wherein the second base coat coating has a nonvolatile concentration of 25 to 35 mass % when coated, and the second base coat coating is a coating such that the second base coating film will have a nonvolatile concentration of 50 to 60 mass% when the second base coating film is formed.

2. The method for forming a shining coating film according to claim 1, wherein the ratio of the dry film thickness of the first base coating film to the dry film thickness of the second base coating film is in the range of 2.5 to 5.

3. The method for forming a shining coating film according to claim 1, wherein the shining materials contained in the first and second base coat coatings are, independently of each other, at least one member selected from the group consisting of an aluminum flake pigment, an interference mica pigment, a colored mica pigment, and alumina flake pigment.

4. The method for forming a shining coating film according to claim 1, wherein the first base coat coating has a shining material content of 5 to 25 mass % based on the nonvolatile concentration of the coating.

5. The method for forming a shining coating film according to claim 1, wherein the second base coat coating has a shining material content of 6 to 35 mass % based on the nonvolatile concentration of the coating.

6. The method for forming a shining coating film according to claim 1, wherein the first and second base coat coatings are compositionally designed so that the mass ratio P1/P2 between the shining material content P1 in the first base coating film and the shining material content P2 in the second base coating film will be in the range of 1/1 to 1/4, and further that when the top clear coating is coated, the total coating film nonvolatile concentration of two layers of the first and second base coating films will not be lower than 75 mass %.

7. The method for forming a shining coating film according to claim 1, wherein the base material is a steel for automobiles or a plastic base material.

8. A coated article, having a coating film, wherein the coating film is formed by the method for forming a shining coating film as recited in claim 1.

9. The method for forming a shining coating film according to claim 1, wherein the polyester-polycarboxylic acid is obtained by modifying a terminal end hydroxyl group of a polyester-polyol with an acid anhydride wherein the polyester-polyol is obtained by ring-opening addition of a lactone compound to a polyfunctional polyol.

* * * * *